(12) United States Patent
Clements et al.

(10) Patent No.: US 9,400,960 B2
(45) Date of Patent: Jul. 26, 2016

(54) METHODS FOR VERIFYING SATISFACTION OF PROGNOSTIC ALGORITHM REQUIREMENTS FOR A COMPONENT HAVING MULTIPLE FAILURE MODES

(76) Inventors: Scott Clements, Fort Worth, TX (US); David S. Bodden, Fort Worth, TX (US)

(*) Notice: Subject to any disclaimer, the term of this patent is extended or adjusted under 35 U.S.C. 154(b) by 1261 days.

(21) Appl. No.: 13/229,057

(22) Filed: Sep. 9, 2011

(65) Prior Publication Data
US 2012/0029973 A1    Feb. 2, 2012

Related U.S. Application Data

(63) Continuation-in-part of application No. 12/358,124, filed on Jan. 22, 2009, now Pat. No. 8,201,424.

(51) Int. Cl.
| | |
|---|---|
| *G06F 11/00* | (2006.01) |
| *G06F 11/36* | (2006.01) |
| *G06F 19/00* | (2011.01) |
| *G06F 17/40* | (2006.01) |
| *G06Q 10/04* | (2012.01) |

(Continued)

(52) U.S. Cl.
CPC .............. *G06Q 10/04* (2013.01); *G06F 11/008* (2013.01); *G06F 11/3604* (2013.01); *G06Q 30/0201* (2013.01); *B64F 5/0045* (2013.01); *G06F 17/40* (2013.01); *G06F 19/00* (2013.01)

(58) Field of Classification Search
CPC ........... B64F 5/00; B64F 5/0045; G01D 7/00; G01D 9/00; G01D 21/00; G06F 8/00; G06F 11/00; G06F 11/008; G06F 11/30; G06F 11/3003; G06F 11/302; G06F 11/3051; G06F 11/3065; G06F 11/32; G06F 11/34; G06F 11/3409; G06F 11/36; G06F 11/3604; G06F 15/00; G06F 15/16; G06F 17/00; G06F 17/10; G06F 17/40; G06F 17/60; G06F 19/00; G06Q 10/00; G06Q 10/04; G06Q 30/00; G06Q 30/04; G06Q 99/00; G07C 3/00; G07C 3/02; G07C 3/04; G07C 3/08; G07C 3/10; G07C 5/00; G07C 5/006; G07C 5/02; G07C 5/04; G07C 5/08; G07C 5/10
USPC .......... 73/1.01, 432.1, 865.9, 866.3; 340/500, 340/540, 579; 377/1, 15, 16; 702/1, 33, 34, 702/127, 182, 183, 184, 186, 187, 189; 705/1.1, 7.11, 7.29, 7.38, 305; 708/100, 105, 200; 714/1, 47.1, 100, 714/E11.02, E11.179, E11.189, E11.192, 714/E11.197, E11.207; 717/100, 124, 126
See application file for complete search history.

(56) References Cited

U.S. PATENT DOCUMENTS

| | | | | |
|---|---|---|---|---|
| 3,362,217 | A * | 1/1968 | Rush et al. | ................. 73/112.01 |
| 6,442,487 | B2 * | 8/2002 | Kim | ................................. 702/6 |

(Continued)

OTHER PUBLICATIONS

Clements, N. Scott et al., Prognostic Algorithm Verification, Lockheed Martin Aeronautics Company, Fort Worth, TX, 2011, Lockheed Martin Proprietary Information, pp. 1-21.

*Primary Examiner* — Edward Cosimano
(74) *Attorney, Agent, or Firm* — Bracewell LLP; James E. Bradley; Keith R. Derrington

(57) ABSTRACT

Methods for verifying satisfaction of prognostic algorithm requirements for a component of a certain device of interest are provided. A method according to an example of an embodiment of the invention can include providing a prognostic algorithm requirements statement for a preselected component contained in each of a plurality of a certain type device, receiving field data indicating a number of premature component failures and a total number of replacements including both due to premature failures and scheduled maintenance, determining a probability density function providing a probability of failing to replace the prematurely failed components, determining a confidence value indicating a level of confidence that failure avoidance requirements provided in the prognostic algorithm statement are being met, and verifying whether or not the prognostic algorithm requirements provided in the prognostic algorithm requirements statement are being satisfied according to a preselected minimum level of confidence.

24 Claims, 15 Drawing Sheets

(51) Int. Cl.
G06Q 30/02 (2012.01)
*B64F 5/00* (2006.01)

(56) References Cited

U.S. PATENT DOCUMENTS

| | | | |
|---|---|---|---|
| 6,934,673 B2* | 8/2005 | Alvarez et al. ................... 703/21 |
| 7,076,350 B2* | 7/2006 | lvarez-Troncoso et al. .... 701/36 |
| 8,201,424 B2* | 6/2012 | Bodden et al. ................... 70/34 |
| 8,527,223 B2* | 9/2013 | AbuAli .................. G06Q 10/06 702/57 |
| 2001/0044698 A1* | 11/2001 | Kim .................................. 702/6 |
| 2002/0177989 A1* | 11/2002 | Alvarez et al. ................... 703/22 |
| 2005/0137764 A1* | 6/2005 | Alvarez-Troncoso et al. . 701/36 |
| 2010/0180418 A1* | 7/2010 | Bodden et al. ............. 29/402.03 |
| 2011/0066391 A1* | 3/2011 | AbuAli ................. G06Q 10/06 702/61 |

* cited by examiner

FIGURE 9

METHODS FOR VERIFYING SATISFACTION OF PROGNOSTIC ALGORITHM REQUIREMENTS FOR A COMPONENT HAVING MULTIPLE FAILURE MODES

RELATED APPLICATIONS

This application is a continuation-in-part of and claims priority to and the benefit of U.S. patent application Ser. No. 12/358,124 filed on Jan. 22, 2009, now U.S. Pat. No. 8,201,424, titled "Synthetic Redundancy Via Prognostics," incorporated by reference in its entirety.

BACKGROUND OF THE INVENTION

1. Field of the Invention

This invention relates in general to maintenance of components having at least one failure mode, and in particular to systems, program product, and methods for prognostic algorithm development and verification of requirements of the prognostic algorithm for a component.

2. Description of the Related Art

Air Vehicles and other integrated systems are beginning to use prognostic algorithms to gauge the remaining useful life of various components. There are several measures that may be output from such algorithms, to include a best estimate of the remaining useful life, the shape of the remaining life distribution, and a best estimate of the time-to-maintenance for a given failure avoidance percentage. Potential benefits of employing prognostic algorithms include increased availability, reduced logistics footprint, and optimized supply chain management. Such algorithms are, however, relatively new outside of the academic and research realms, and thus, specifying the requirements of such an algorithm and, moreover, verifying the algorithm are still open questions.

Accordingly, recognized by the inventors is the need for systems, program product, and methods which provide a template for a prognostic algorithm and a statistical approach to verifying the requirement using field data such as, for example, maintenance data which is already being recorded.

SUMMARY OF THE INVENTION

In view of the foregoing, various embodiments of the present invention advantageously provide systems, program product, and methods of performing a verification of satisfaction of requirements of a prognostic algorithm requirements statement to monitor management of component part replacement for mechanical, electrical, and structural devices that have one or more failure modes and employ prognostic algorithms to predict time-to-maintenance. Such devices can include vehicles such as, for example, an aircraft or other piece of equipment containing important components having one or more failure modes and requiring managed maintenance. Various embodiments of the present invention also provide systems, program product, and methods which provide a template for a prognostic algorithm and a statistical approach to verifying the requirement using, for example, field maintenance data which is already being recorded. According to one or more embodiments of the present invention, with respect to device components such as, for example, those of an aircraft or other air vehicle, the field data available for verification includes (1) how many instances of a component (across a fleet, for instance) were replaced, and (2) of those, how many failed before they were replaced—as opposed to how many were replaced based on a time-to-maintenance prediction.

More specifically, an example of an embodiment of a method of performing a verification of satisfaction of requirements of a prognostic algorithm requirements statement to monitor management of component part replacement for a device can include, for example, the step of providing a prognostic algorithm requirements statement for a preselected component contained in each of a plurality of such devices. In order to both identify overly conservative and ineffective implementations of maintenance procedures designed to satisfy the requirements of the prognostic algorithm requirements statement, the statement can be in a form at least substantially similar to the following: "the prognostic algorithm or algorithms shall provide a minimum of <TTM> hours time-to-maintenance such that between <LOWER>% and <UPPER>% of failures of <COMPONENT NAME> will be avoided with <LEVEL>% confidence" for a component having a single failure mode, and "the prognostic algorithm or algorithms shall provide a minimum of <TTM> hours time-to-maintenance such that between <LOWER 1>% and <UPPER 1>% of <FAILURE_MODE_1> failures, <LOWER_2>% and <UPPER_2>% of <FAILURE_MODE_2> failures, . . . , and <LOWER_n>% and <UPPER_n>% of <FAILURE_MODE_n> failures of <COMPONENT NAME> will be avoided with <LEVEL>% confidence" for a component having multiple failure modes.

The method can also include the step of receiving field data indicating a number of component failures of the preselected component contained in each of the plurality of devices occurring prior to replacement as part of a maintenance program implementing one or more time-to-maintenance measures provided by a corresponding one or more prognostic algorithms designed to satisfy requirements indicated in the prognostic algorithm requirements statement, and indicating a total number of replacements of the preselected component for each of the plurality of devices.

The method also includes the step of determining a probability density function providing a probability of failing to replace a number of the preselected components as part of the maintenance program due to failure of the respective components before being replaced according to the one or more time-to-maintenance measures provided by the corresponding one or more prognostic algorithms designed to satisfy requirements indicated in the prognostic algorithm requirements statement. According to an embodiment of the method, the step of determining a probability density function can include determining a joint probability function for a plurality of failure modes each associated with the preselected component.

Responsive to the determined probability density function and/or the field maintenance data, a confidence value indicating a level of confidence that failure avoidance requirements provided in the prognostic algorithm statement are being met, can be determined. Further, responsive to the determined confidence value, a verification of whether or not the prognostic algorithm requirements provided in the prognostic algorithm requirements statement are being satisfied according to a preselected minimum level of confidence, can be performed. According to an embodiment of the method, the step of determining a confidence value can include determining a confidence value that accounts for individual prognostic algorithm requirements for each of a plurality of failure modes each associated with the preselected component. The step of determining a confidence value can also or alternatively include accounting for one or more non-prognosticable failure modes.

According to an embodiment of the method, the steps can also or alternatively include forming a two-dimensional table or chart identifying confidence level values based upon a continuum of the number of component failures of the preselected component prior to scheduled replacement and a continuum of the total number of replacements of the preselected component for each of the plurality of devices. Advantageously, the chart can be two-dimensional such as, for example, when the implementation considers a verification of an overall requirement for a given component. This can be readily printed out and used by maintenance managers and quality assurance managers to verify requirements are being met and to identify when a sufficient number of replacements and/or failures have been reached in order to rely upon the data. This type of table, when extremely large, however, is generally best managed by a computer which can be queried to identify when the minimum number of failures/replacements have been made and/or provide the necessary verification data.

Advantageously, various embodiments of the present invention implement methodologies that provide a rigorous approach to writing vendor requirements with respect to component prognostics and verification that the requirements are met. Beneficially, such embodiments can provide a significant advantage with regard to Performance Based Logistics (PBL) type contracts and overall air vehicle reliability. Such methodologies can include use of threshold requirements (i.e., "capture 95% of all failures") as a starting point for verification. Advantageously, various embodiments of the present invention not only apply to vehicles (both aerial and earth-bound), but can apply to other devices such as, for example, a stereo, a dishwasher, a printing press, etc.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is a portion of a table illustrating confidence levels for varying values of x and n according to an embodiment of the present invention;

DETAILED DESCRIPTION

Figure 1:
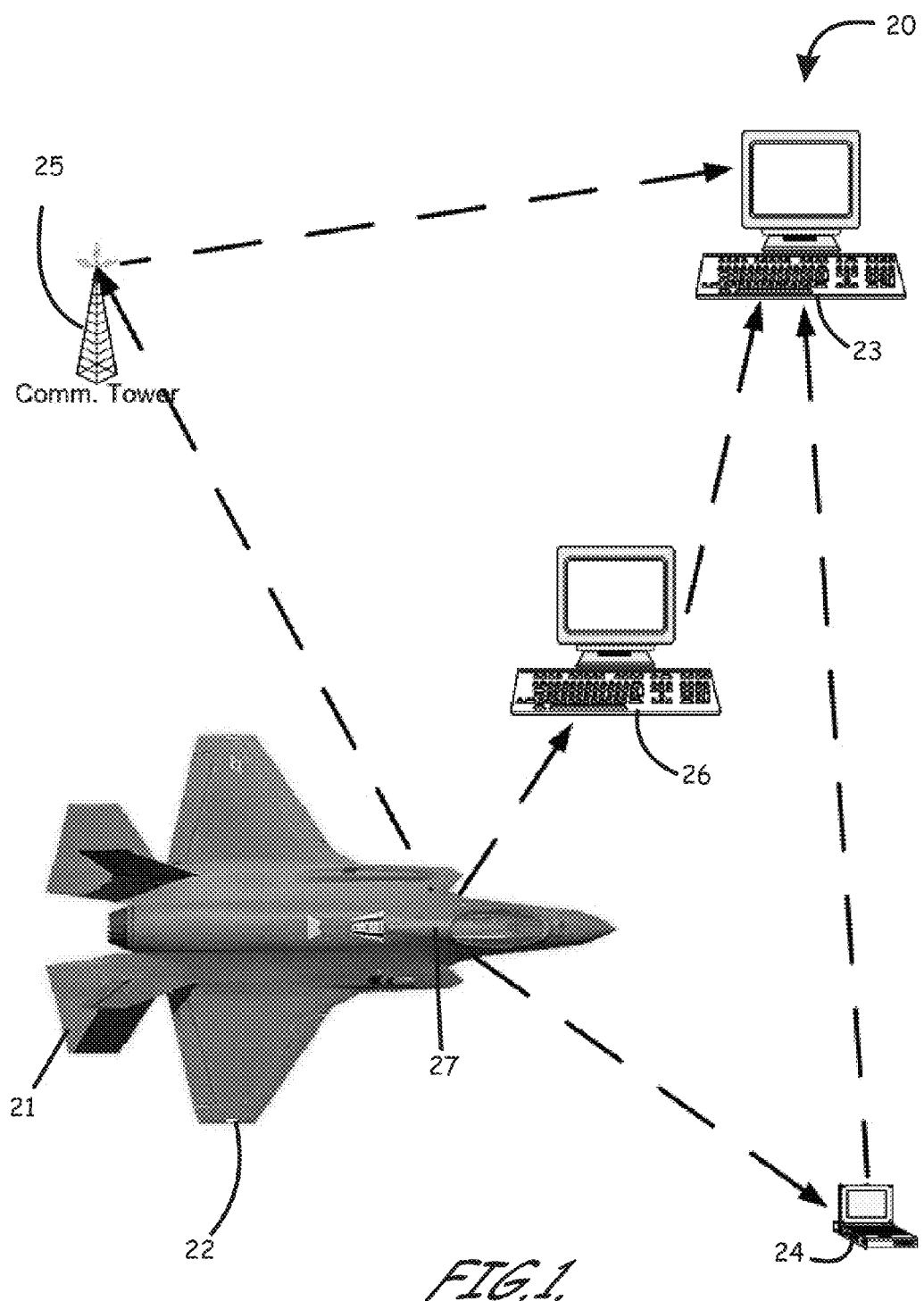
FIG. 1 is a schematic diagram of a system for gathering component part data for each of a plurality of components on a device in the form of an aircraft according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Prognostic algorithms inherently have some uncertainty associated with them. Ideally, one would characterize this uncertainty as a probability distribution around a mean or predicted value. The "width" of this distribution is indicative of how precise the prediction is. While useful for theoretical work, working with prediction distributions, characterized by probability density functions (pdf's), poses many problems for verification of algorithm performance. First, they are often difficult to characterize. Second, they tend to taper off on either side with long tails, making it difficult to make a claim, such as, for example, that the algorithm "captures 100% of all failures." Third, and most notably, the data necessary to verify a pdf may not be available.

Air Vehicles and other integrated systems/devices can use prognostic algorithms to gauge the remaining useful life of various components. With respect to such implementation, the prognostic algorithms generally provide a remaining useful life, or, equivalently, a time-to-maintenance, with a certain confidence. For example, a prognostic algorithm for an actuator may indicate that if the actuator is replaced after ten more hours of use, there is a 95% probability that the actuator will not have failed by that time. If this algorithm is implemented on a large scale such as, for example, through application to the same actuator across multiple aircraft in a fleet over several years, one would expect that approximately 95% of the replacements will occur before a failure has occurred. One would also expect about 5% of the actuators will fail before the indicated time. It is a basic concept behind the prognostic algorithm implementation that the prognostic algorithm is, in fact, expected to "miss" a small percentage of failures, otherwise the algorithm would be too conservative. For example, suppose an actuator were replaced one hundred times, of which six were prompted by a failed actuator and the other ninety-four based solely on the prognostic indication. This would seem about right, as it is close to the expected 95% rate and could thus be verified as having satisfied the requirement. Instead, however, if fifty of the actuators had failed, the prognostic algorithm would not be satisfying the requirement and would not be verified. If instead none of the actuators had failed prior to replacement, the prognostic algorithm also would not be satisfying the requirements and would not be verified.

The verification process becomes even more complicated when one considers that a single component may have several failure modes, each of which may or may not have its own unique prognostic algorithm. Based on the approach just described, various embodiments of the present invention provide (1) a template for writing a requirements statement for a prognostic algorithm which is meaningful and verifiable and (2) a rigorous statistical method for verifying such requirements.

Those of ordinary skill in the art will recognize that verification need not entail determining how well the prognostic algorithm is determining the actual remaining useful life distribution of a component. In fact, the prognostic algorithm does not even need to explicitly calculate the remaining life distribution. Rather, the approach to verification is based, for example, off the "avoid 95% of failures" portion of the requirement statement. Specifically, according to various embodiments of the present invention, the verification evaluates whether the time-to-maintenance value, which the prognostic algorithm does provide, is adequately avoiding the specified percentage of failures or range of percentage of failures with the specified confidence level.

FIG. 1 illustrates a typical system 20 for gathering component part data for each of a plurality of components 21 on a vehicle or other integrated system/devices such as, for example, an aircraft 22. According to an exemplary embodiment, the system 20 includes a computer 23 which executes one or more a prognostic health management ("PHM") algorithms for each of the plurality of components 21 and monitors a variety of data regarding the components 21. The data may come from sensors within the components 21, sensors and telemetry from the aircraft 22, and/or off board maintenance information 24. The off board maintenance information 24 may include, for example, the number of hours the components 21 have operated, maintenance history of the aircraft, and the like. The sensor and telemetry data from the aircraft 22 may be transmitted through a communication device 25 to the off-board PHM computer 23, or the data may be downloaded from the aircraft 22 to a data collection device 26 and sent to the PHM computer 23 at a later time. The off board PHM computer 23 processes the data from the various sources and applies it to the PHM algorithm. The algorithm indicates whether to replace the component 21. The on-board computer 27, which could be the vehicle/device management computer or flight control computer, may apply the PHM algorithm(s) to make real-time mission decisions such as, for example, whether to abort a flight, shorten the duration of the flight, etc. The on-board computer 27 may use any information about the component 21 including, for example, efficiency and responsiveness. The onboard computer 27 can provide the results of the PHM algorithm and/or other maintenance information directly or indirectly to off-board computer 23.

Figure 2:
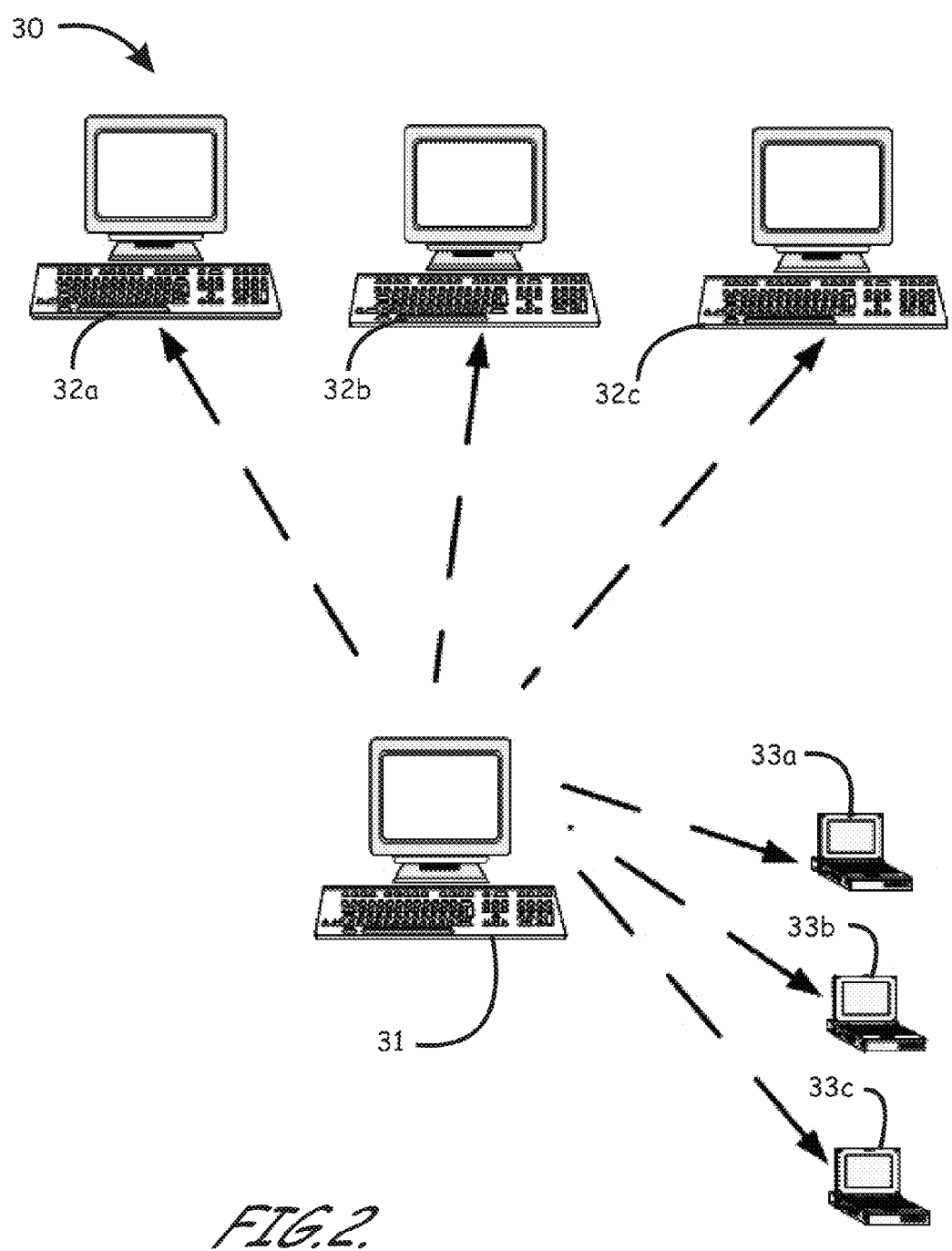
FIG. 2 is a schematic diagram of a system for verifying that the requirements of one or more prognostic algorithms for a device component are met according to an embodiment of the present invention.

FIG. 2 illustrates an example of a system 30 for verifying that the requirements of one or more prognostic algorithms for the vehicle/device component (e.g., component 21) are met. According to the exemplary embodiment, the system 30 can include a statistical processing computer 31, one or more PHM computers such as 32a-32c in communication therewith, and one or more field maintenance data computers data 33a-33c. The statistical processing computer 31 can include a processor or processors, internal or external memory in communication with the processor(s), and statistical processing program product stored in the memory or otherwise stored in some other form computer readable medium that when read and executed by the computer 31, causes the computer 31 to perform the verification steps described herein. As will be described in more detail below, data from the one or more PHM computers such as 32a-32c, as well as field maintenance data computers 33a-33c, is compiled on the statistical processing computer 31 to determine whether the algorithm is meeting its requirements.

Note, the statistical processing program product can be in the form of microcode, programs, routines, and symbolic languages that provide a specific set or sets of ordered operations that control the functioning of the hardware and direct its operation, as known and understood by those skilled in the art. Note also, the statistical processing program product, according to an embodiment of the present invention, need not reside in its entirety in volatile memory, but can be selectively loaded, as necessary, according to various methodologies as known and understood by those skilled in the art.

According to an exemplary configuration, the system 30, through either manual or automated operations, receives one or more requirements for a prognostic algorithm (typically established during a procurement process), which provides the maintainer a time-to-maintenance measure for component replacement and a confidence level to indicate whether the algorithm is meeting the one or more requirements. According to the exemplary embodiment, a "failure" is indicated when an installed part stops working prior to replacement. A part may have multiple "failure modes" where each failure mode is a different manner in which the part or system could fail. A requirement and confidence level could be, for example, to avoid 95 to 99 percent of the failures of a particular component with a 90 percent confidence level. The means of determining the requirement and confidence level will be described below.

U.S. patent application Ser. No. 12/358,124 filed on Jan. 22, 2009, now U.S. Pat. No. 8,201,424, titled "Synthetic Redundancy Via Prognostics," incorporated herein by reference in its entirety, provides a detailed discussion regarding prognostic algorithm requirement determination for a single failure mode, failure mode effects and criticality analysis, failure modes severity classification and assessment, failure mode predictability/maturity assessment, development of a heuristic prognostic confidence index, determination of a heuristic prognostic confidence level, part replacement based on remaining usable life, development of a confidence growth curve to compare an actual confidence level based on field data to an expected or minimum confidence level, determination of prognostic algorithm effectiveness, provision of upper and lower failure avoidance boundaries to prevent overly conservative requirements, confidence level establishment, verification that the requirements of the algorithm are being met for a single failure modes.

U.S. patent application Ser. No. 12/358,124, now U.S. Pat. No. 8,201,424, also provides a discussion of single failure mode construction to include prognostic algorithm time-to-maintenance prediction, exemplary binomial distributions, maximum likelihood estimation for differing values of the number of component failures occurring prior to the predicted time-to-maintenance and the corresponding number of components replaced prior to failure, provision of confidence levels based on varying numbers of missed failures (x) versus total component replacements (n), verification of requirements of the prognostic algorithm, data requirements, and utilization of a confidence growth curve used to bound the time and data required for verification for a single failure mode case. Regarding verification of requirements, in order to both identify overly conservative and ineffective implementations of maintenance procedures designed to satisfy the requirements of the prognostic algorithm requirements statement, a requirements statement can be provided, for example, in a form at least substantially similar to the following: "the prognostic algorithm or algorithms shall provide a minimum of <TTM> hours time-to-maintenance such that between <LOWER>% and <UPPER>% of failures of <COMPONENT NAME> will be avoided with <LEVEL>% confidence."

Extension to Multiple Failure Modes

Components often have many failure modes. The components, however, are generally only assigned prognostic algorithms to cover the most severe or frequent one(s). Accordingly, the inventors have recognized the need to extend the verification process to include verification of performance for multiple prognostic algorithms covering multiple failure modes for a component. In order to both identify overly conservative and ineffective implementations of maintenance procedures designed to satisfy the requirements of the prognostic algorithm requirements statement for components having multiple failure modes, the statement can be modified to be in a form at least substantially similar to the following: "the prognostic algorithm or algorithms shall provide a minimum of <TTM> hours time-to-maintenance such that between <LOWER_1>% and <UPPER_1>% of <FAILURE_MODE_1> failures, <LOWER_2>% and <UPPER_2>% of <FAILURE_MODE_2> failures, . . . , and <LOWER_n>% and <UPPER_n>% of <FAILURE_MODE_n> failures of <COMPONENT NAME> will be avoided with <LEVEL>% confidence" for a component having multiple failure modes. Alternatively written, the statement can be in a form at least substantially similar to the following: the prognostic algorithm or algorithms shall provide a minimum of <TTM> hours time-to-maintenance such that between <LOWER_x>% and <UPPER_x>% of <FAILURE_MODE_x> failures of <COMPONENT NAME> for each of x=1 to n plurality of failure modes will be avoided with <LEVEL>% confidence.

Nevertheless, even in a multiple failure mode environment, the single failure mode approach has applicability such as, for example, when considering the total prognostic requirement for a component. That is, if the goal is to determine how well a given component is meeting a goal of, say, between 95% and 99% coverage of all failure modes given whatever prognostic algorithm(s) are implemented, the single failure mode verification approach can be used. If, however, the desire is to account for how well the individual algorithms for a single component are meeting individual goals, a multiple failure mode approach is warranted.

This extension to multiple failure modes is presented below in three steps. First, a case example for a single component having two failure modes, each of which has its own prognostic algorithm, is described, and an overall confidence algorithm is constructed from probabilistic principles for this two failure mode case. Second, a case example for an arbitrary number of failure modes, where each has its own prognostic algorithm, is described. Finally, the situation where one or more failure modes for a component having multiple failure modes are not assigned a prognostic algorithm.

Two Failure Mode Construction

To describe the approach taken in this extension, consider the case of a component with two failure modes. Further, assume that the component has been replaced a total of four times (n=4), of which two were due to a component failure (x=2) which occurred before the components were replaced preemptively. There are several scenarios which could lead to this result, as shown in Table 1, below. The first column of the table ($n_1$) is the number of times the component was replaced due to failure mode $m_1$. This includes both preemptive replacements based on prognostic indications and replacements required due to a failure of the component due to failure mode $m_1$. The second column ($x_1$) is the number of times the component failed due to failure mode $m_1$ before being replaced preemptively based on a prognostic indication. The next two columns ($n_2$ and $x_2$) represent the corresponding values for failure mode $m_2$.

TABLE 1

Possible Scenarios for Two Failure Modes

| $n_1$ | $x_1$ | $n_2$ | $x_2$ | $n = n_1 + n_2$ | $x = x_1 + x_2$ |
|---|---|---|---|---|---|
| 0 | 0 | 4 | 2 | 4 | 2 |
| 1 | 0 | 3 | 2 | 4 | 2 |
| 2 | 0 | 2 | 2 | 4 | 2 |
| 1 | 1 | 3 | 1 | 4 | 2 |
| 2 | 1 | 2 | 1 | 4 | 2 |
| 3 | 1 | 1 | 1 | 4 | 2 |
| 2 | 2 | 2 | 0 | 4 | 2 |
| 3 | 2 | 1 | 0 | 4 | 2 |
| 4 | 2 | 0 | 0 | 4 | 2 |

There are several things to note in this table. First, the total number of replacements (n) for each scenario must equal the (known) total number of replacements for the component. Similarly, the total number of failures (x) for each scenario must equal the (known) total number of failures for the component. Also, for each failure mode, the number of replacements due to that failure mode cannot be less than the number of actual failures due to that failure mode. Stated algebraically, $n_i \geq x_i$. Finally, the individual failure mode values of $n_1$, $x_1$, $n_2$, and $x_2$, as opposed to the totals (n and x), may not be known.

As in the derivation for a single failure mode, the probability of missing $x_i$ out of $n_i$ failures given that the failure mode is $m_i$ (with corresponding value $f_i$) is given by:

$$P(x_i, n_i \mid m_i) = \binom{n_i}{x_i}(1 - f_i)^{x_i} f_i^{n_i - x_i}. \quad (1)$$

The total probability, P(x,n), for the two occurrence case, can then be found as:

$$P(x,n) = \Sigma P(x_1, n_1 \mid m_1) P(x_2, n_2 \mid m_2) P((m_1, n_1),(m_2, n_2)) \quad (2)$$

where the summation is taken over all possible scenarios as given in Table 1.

The last term in the above summation, $P((m_1,n_1),(m_2,n_2))$, is the probability that $m_1$ occurred $n_1$ times and $m_2$ occurred $n_2$ times and is given by:

$$P((m_1, n_1), (m_2, n_2)) = \binom{n}{n_1, n_2} P(m_1)^{n_1} P(m_2)^{n_2}. \quad (3)$$

The term $$\binom{n}{n_1, n_2}$$

is the multinomial coefficient (a generalization of the binomial coefficient). In general, the multinomial coefficient is given by:

$$\binom{n}{n_1, n_2, \ldots, n_k} = \frac{n!}{n_1! n_2! \ldots n_k!}. \quad (4)$$

This coefficient can be thought of as the number of ways that n objects can be placed in k bins with $n_1$ objects in the first bin, $n_2$ objects in the second bin, etc. In this way, the binomial coefficient is a special case of the multinomial coefficient:

$$\binom{n}{x} = \frac{n!}{(n-x)! x!} = \binom{n}{(n-x), x}. \quad (5)$$

The term $P(m_i)$ is the a priori known relative probability that a failure is due to failure mode $m_i$. This term can be determined from standard reliability data, such as Mean Time Between Failures (MTBF). If the MTBF for failure mode $m_i$ is given by $MTBF_i$, the relative probability for failure mode $m_i$ is given by:

$$P(m_i) = \frac{MTBF_i^{-1}}{\sum_{i=1}^{k} MTBF_i^{-1}}. \quad (6)$$

Returning to the example of two failure modes (Table 1) with n=4, x=2, the total probability, P(2, 4), is given by:

$$P(2, 4) = P(0, 0 \mid m_1) P(2, 4 \mid m_2) \binom{4}{0, 4} P(m_1)^0 P(m_2)^4 + \quad (7)$$

$$P(0, 1 \mid m_1) P(2, 3 \mid m_2) \binom{4}{1, 3} P(m_1)^1 P(m_2)^3 +$$

$$P(0, 2 \mid m_1) P(2, 2 \mid m_2) \binom{4}{2, 2} P(m_1)^2 P(m_1)^2 P(m_2)^2 +$$

$$P(1, 1 \mid m_1) P(1, 3 \mid m_2) \binom{4}{1, 3} P(m_1)^1 P(m_2)^3 +$$

$$P(1, 2 \mid m_1) P(1, 2 \mid m_2) \binom{4}{2, 2} P(m_1)^2 P(m_2)^2 +$$

$$P(1, 3 \mid m_1) P(1, 1 \mid m_2) \binom{4}{3, 1} P(m_1)^3 P(m_2)^1 +$$

-continued $$P(2, 2 \mid m_1) P(0, 2 \mid m_2) \binom{4}{2, 2} P(m_1)^2 P(m_2)^2 +$$

$$P(2, 3 \mid m_1) P(0, 1 \mid m_2) \binom{4}{3, 1} P(m_1)^3 P(m_2)^1 +$$

$$P(2, 4 \mid m_1) P(0, 0 \mid m_2) \binom{4}{4, 0} P(m_1)^4 P(m_2)^0$$

As an example calculation, let $f_1=0.8$, $f_2=0.9$, $MTBF_1=5000$ hours, and $MTBF_2=2000$ hours. Then the following calculations follow:

$$P(m_1) = \frac{\frac{1}{5000}}{\frac{1}{5000} + \frac{1}{2000}} = 0.2857 \quad (8)$$

$$P(m_2) = \frac{\frac{1}{2000}}{\frac{1}{5000} + \frac{1}{2000}} = 0.7143$$

$$P(1, 3 \mid m_1) = \binom{3}{1}(1 - 0.8)^1 (0.8)^{3-1}$$
$$= \frac{3!}{(3-1)! 1!} (0.2)^1 (0.8)^2$$
$$= 3(0.2)(0.64)$$
$$= 0.256$$

$$P(1, 1 \mid m_2) = \binom{1}{1}(1 - 0.9)^1 (0.9)^{1-1}$$
$$= \frac{1!}{(1-1)! 1!} (0.1)^1 (0.9)^0$$
$$= 1(0.1)(1)$$
$$= 0.1$$

$$\binom{4}{3, 1} = \frac{4!}{3! 1!} = \frac{24}{6} = 4$$

$$P(1, 3 \mid m_1) P(1, 1 \mid m_2) \binom{4}{3, 1} P(m_1)^3 P(m_2)^1 = (0.256)(0.1)(4)$$
$$(0.2857)^3 (0.7143)^1$$
$$= 0.001706$$

Figure 3:
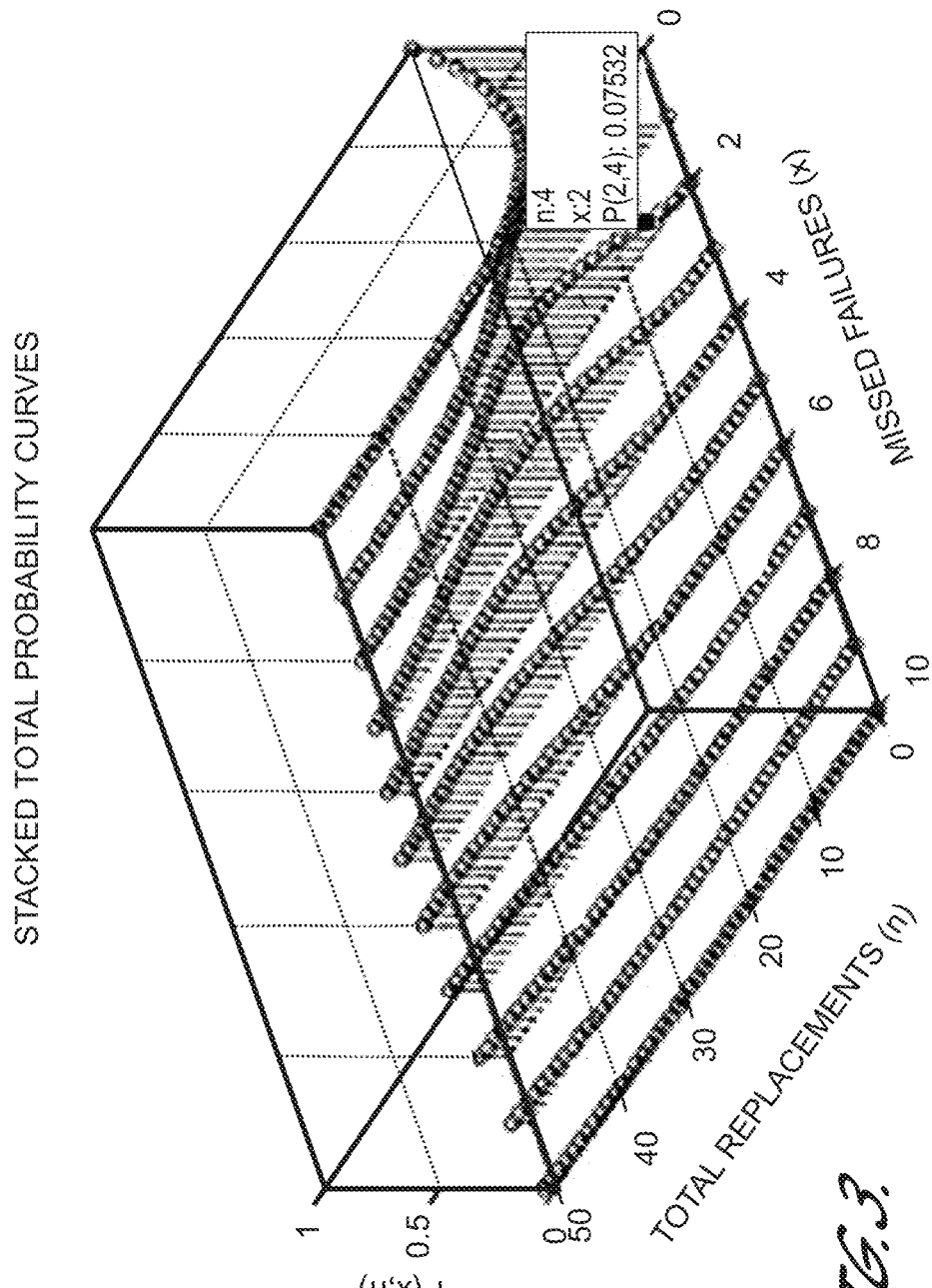
FIG. 3 is a graph illustrating of stacked total probability curves.

The last calculation shown is one term in the larger expression of the calculation of P(2,4). Carrying out the full calculation yields P(2,4)=0.07532. This value is interpreted to mean that there is a 7.53% probability that there will be 2 missed failures out of 4 total replacements, given two failure modes with the given MTBF values and prognostic algorithms with the given $f_i$ values. FIG. 3 is a 3-D stem plot of this total probability calculated for values of x between 0 and 10 and values of n between 0 and 50. In FIG. 3, the values of $f_1$ and $f_2$ are held constant while x and n are varied. In operation, the values of x and n will be known and an issue may be to determine the most probable ranges of $f_1$ and $f_2$. To address this question, one can plot the probability P(x,n) for various values of $f_1$ and $f_2$ for given values of x and n.

Figure 4:
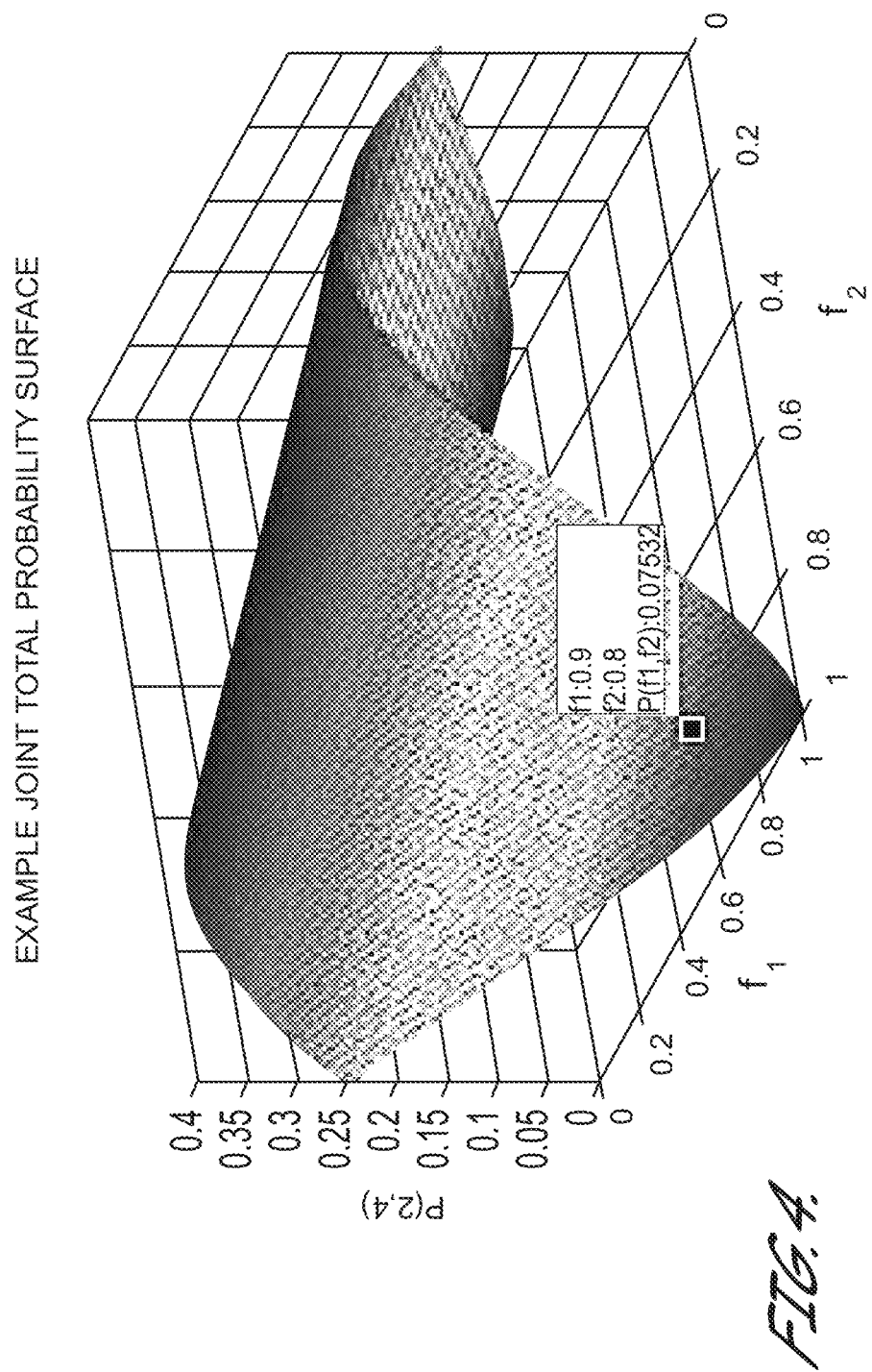
FIG. 4 is a graph illustrating of a plot of total probabilities for all values of $f_1$ and $f_2$ percent of failures that would be avoided by performing maintenance at indicated times for two failure modes respectively with x=2 prematurely failed components and n=4 total replaced components according to an embodiment of the present invention.
Figure 5:
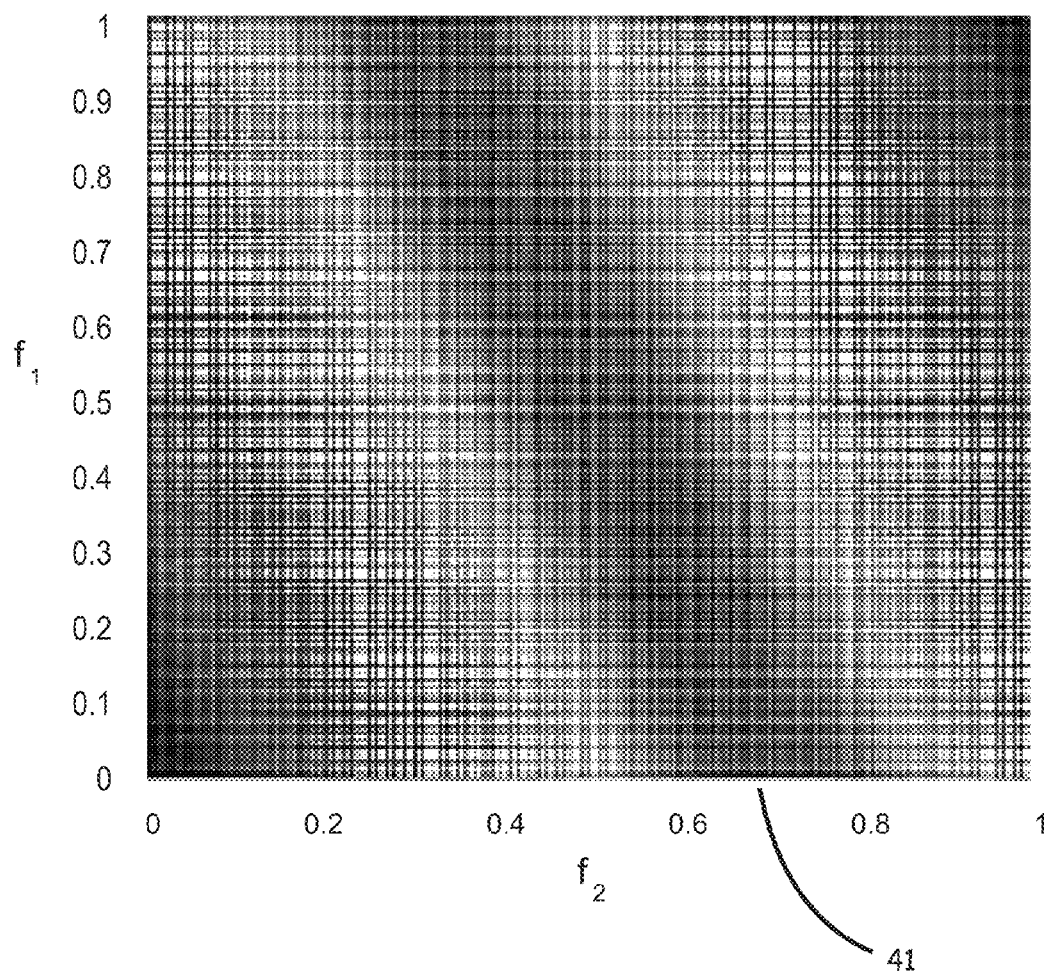
FIG. 5 is a graph illustrating of a heat map of total probabilities for all values of $f_1$ and $f_2$ with x=2 and n=4 according to an embodiment of the present invention.

FIG. 4 shows such a plot for the previous example (x=2 and n=4). The point highlighted on the plot (with $f_1$=0.9 and $f_2$=0.8) corresponds to the same point highlighted in FIG. 3. Several observations can be made of FIG. 4. First, the values $f_1$ and $f_2$ are continuous and bounded ($0 \le f_i \le 1$). Thus, the plot is a true surface and not discrete values. Second, the values of $f_1$ and $f_2$ which have the highest total probability form a skewed line. This trend is more easily seen when the total probability plot is viewed "straight down", as shown in FIG. 5. Such a 2-dimensional plot is called a "heat map", as the 3$^{rd}$ dimension is depicted purely as a gradient color (typically from blue to red). Recall that this example assumes we have "missed" 2 out of 4 failure events (x=2 and n=4). Thus, the probability that both prognostic algorithms have $f_i$ values of 50% ($f_1$=0.5 and $f_2$=0.5) should be high. As shown most readily in the heat map of FIG. 5, this is indeed the case. However, since it is not presumed known how the values of x and n break down in relation to each failure mode, there are other scenarios which are just as probable. For example, the algorithm associated with failure mode $m_1$ may have a better (higher) value of $f_1$ which is compensated by a worse (lower) value of $f_2$. This tradeoff is evidenced by the straight banding of colors shown at 41 in FIG. 5. If the failure rates (or MTBFs) of the two failure modes were equal, this line would be at a 45° angle to the f-axes. In this example, however, failure mode $m_2$ has a higher failure rate (or, equivalently, a lower MTBF) than failure mode $m_1$. Thus, a change in the value of $f_2$ will have a more pronounced effect on the total probability than a change in the value of $f_1$. This is illustrated by the skewing of the bands of the heat map to the $f_2$=0.5 line (to the vertical).

Figure 6:
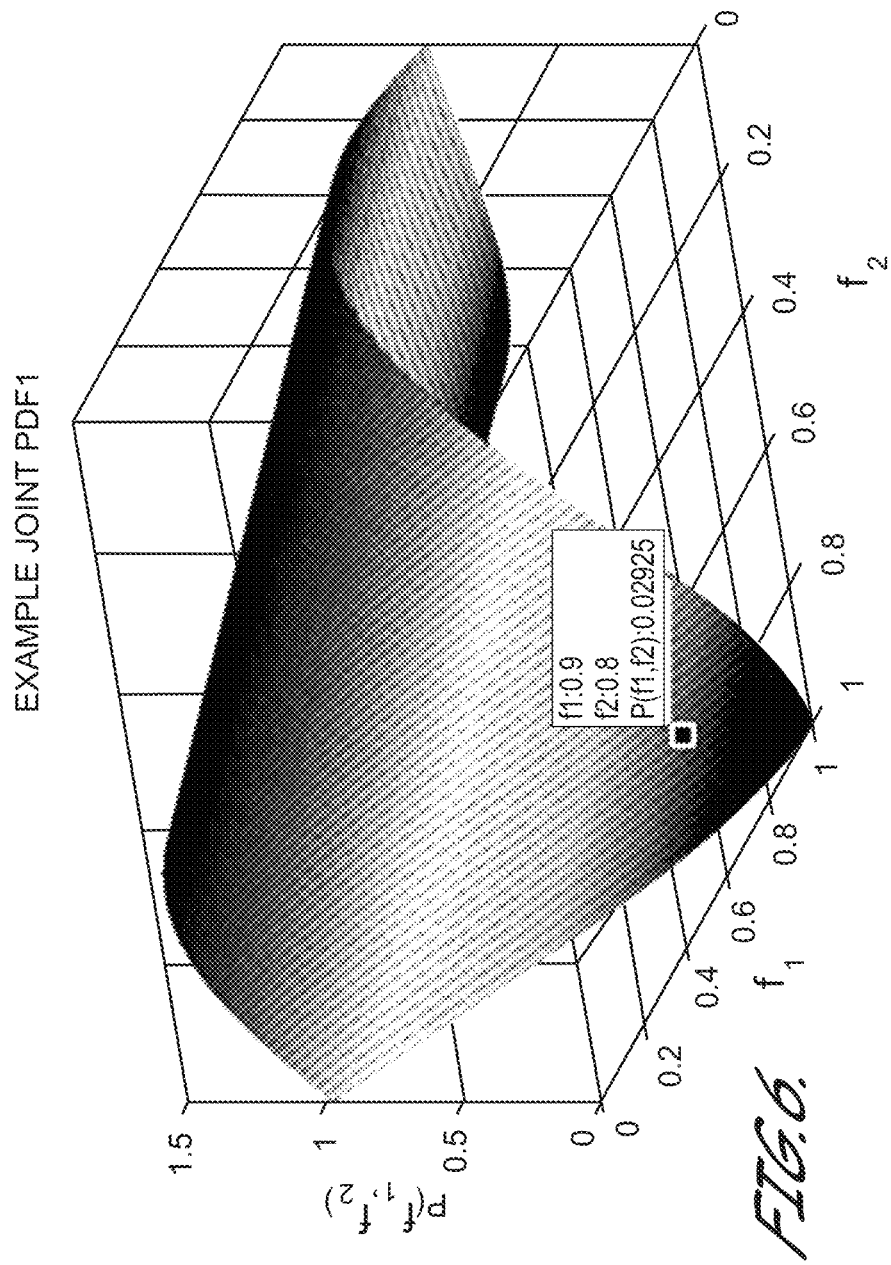
FIG. 6 is a graph illustrating a joint probability density function (pdf) of $f_1$ and $f_2$ with x=2 and n=4.

Continuing with the generalization of the approach outlined for the single failure mode case, the total probability surface shown in FIG. 4 is the joint maximum likelihood estimate (MLE) of the values of $f_1$ and $f_2$. Thus, if the surface is normalized such that the total volume under the surface is 1.0, the resulting surface will be the joint probability density function (pdf) of the values $f_1$ and $f_2$. For the example being carried through this discussion, the resulting pdf is shown in FIG. 6. Note that this joint pdf surface is the same shape as that of FIG. 4 with the only difference being the scaling of the z-axis.

Having calculated the joint pdf, determining the confidence that the $f_i$ values of the two prognostic algorithms are in given ranges is simply a matter of integrating the joint pdf over the ranges of interest. For example, to determine the confidence (probability) that $0.45 \leq f_1 \leq 0.55$ and $0.4 \leq f_2 < 0.6$, the following double integral would be evaluated:

$$\int_{0.4}^{0.6} \int_{0.45}^{0.55} p(f_1, f_2) df_1 df_2, \quad (9)$$

where $p(f_1, f_2)$ is the joint pdf.

For the case of x=2 and n=4, the integration will yield the following:

$$\int_{0.4}^{0.6} \int_{0.45}^{0.55} p(f_1, f_2) df_1 df_2 = 2.87\% \quad (10)$$

Figure 7:
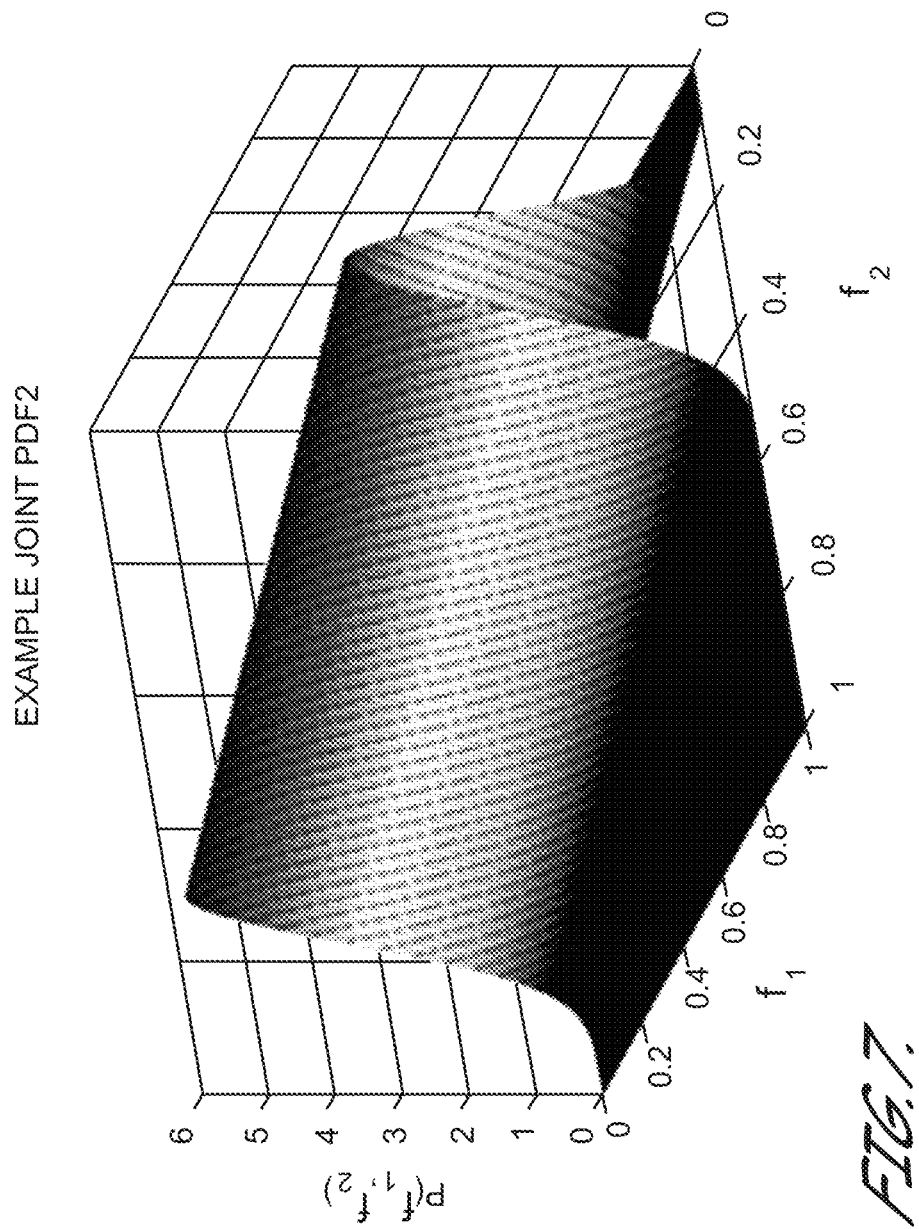
FIG. 7 is a graph illustrating a joint pdf of $f_1$ and $f_2$ with x=50 and n=100 according to an embodiment of the present invention.

Although this confidence value appears rather small, it is not unusual as the total number of replacements (n) in this example is just four. If the number of replacements is increased to n=100 and the number of missed failures kept at 50% (x=50), the resulting pdf is shown in FIG. 7. Compared to FIG. 4, this pdf has much sharper roll-offs on either side of the "high-probability" line. The resulting confidence is also higher:

$$\int_{0.4}^{0.6} \int_{0.45}^{0.55} p(f_1, f_2) df_1 df_2 = 8.46\% \quad (11)$$

Figure 8:
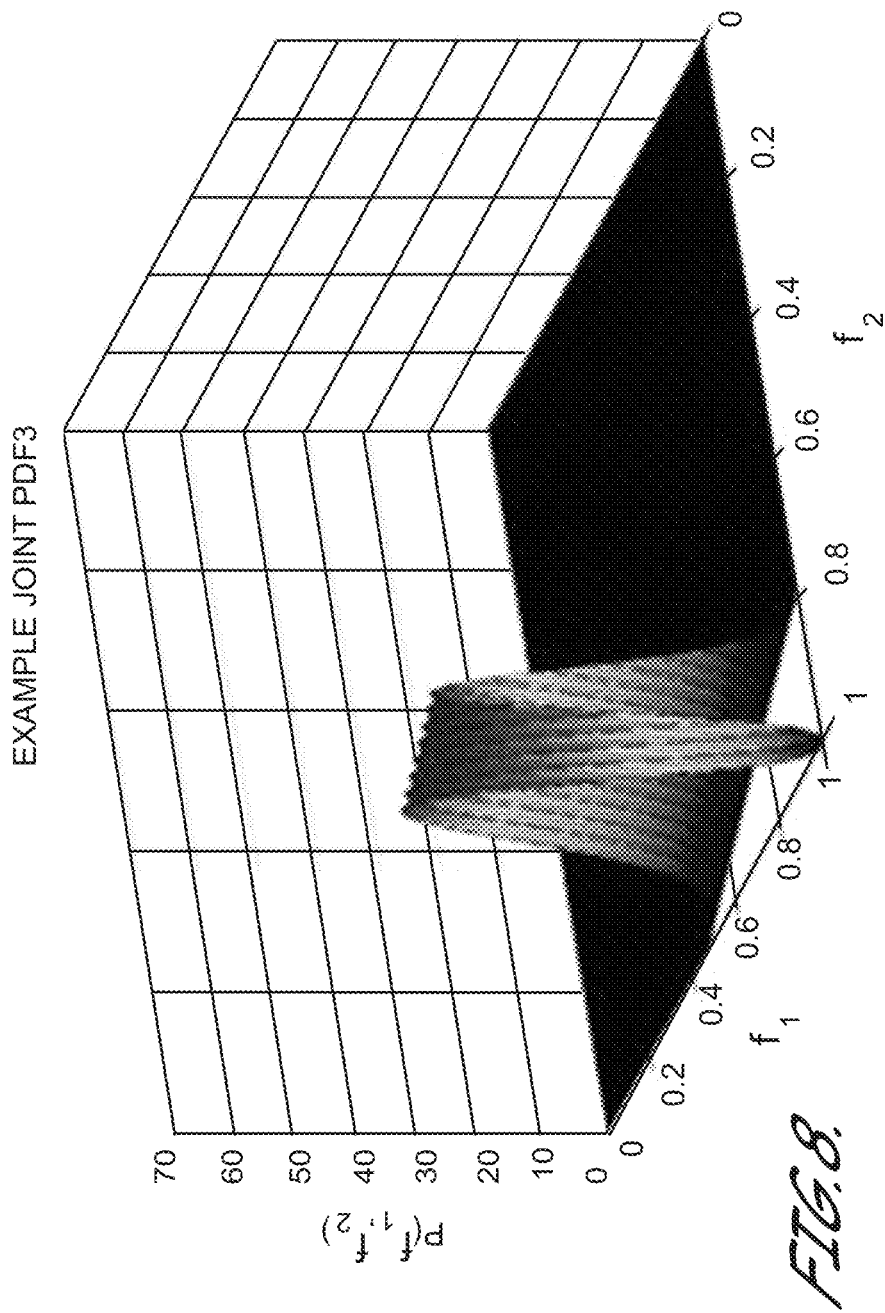
FIG. 8 is a graph illustrating a joint pdf of $f_1$ and $f_2$ with x=5 and n=100 according to an embodiment of the present invention.

Even with the sharper roll-off from a higher number of replacements (n), the confidence for this example is still only 8.46%. This is primarily due to the large number of combinations of failure modes that will yield around 50% prediction (i.e., $f_1 \approx 0.5$ and $f_2 \approx 0.5$). A perhaps more realistic example, shown in FIG. 8, represents five missed failures (x=5) out of 100 replacements (n=100). Calculating the confidence that $0.8 \leq f_1 \leq 0.99$ and $0.9 \leq f_2 \leq 0.99$ yields a value of 64.31%:

$$\int_{0.9}^{0.99} \int_{0.8}^{0.99} p(f_1, f_2) df_1 df_2 = 64.31\%. \quad (12)$$

Generalization to k Failure Modes.

The generalization of failure modes to an arbitrary number of failure modes is generally straightforward, however, the process quickly turns into an exercise in proper indexing. The primary points to keep in mind include, for example, an understanding that all combinations of $P(x_i, n_i)$ must be accounted for and weighted based on their frequency and relative failure rate, and for each scenario (i.e., set of values $\{x_i\}$ and $\{n_i\}$), the following must be true: $\Sigma_{i=1}^k x_i = x$, $\Sigma_{i=1}^k n_i = n$, and $n_i \geq x_i$.

One solution is presented below.

$$P(x, n) = \sum_{x_1=0}^{x} \sum_{x_2=0}^{x-x_1} \cdots \sum_{x_{k-1}=0}^{x-\Sigma_{i=1}^{k-2}x_i} \sum_{n_1=x_1}^{x_1+s} \sum_{n_2=x_2}^{x_2+s-s_1} \cdots \sum_{n_{k-1}=x_{k-1}}^{x_{k-1}+s-\Sigma_{i=1}^{k-2}s_i} \left\{ \binom{n}{n_1, n_2, \ldots, n_k} \prod_{i=1}^{k} [P(x_i, n_i \mid m_i) P(m_i)^{n_i}] \right\} \quad (13)$$

with:

$$s = n - x \quad (14)$$
$$s_i = n_i - x_i$$
$$x_k = x - \sum_{i=1}^{k-1} x_i$$
$$n_k = x - \sum_{i=1}^{k-1} n_i$$
$$P(x_i, n_i \mid m_i) = \binom{n_i}{x_i}(1 - f_i)^{x_i} f_i^{n_i - x_i}$$

The k-dimensional joint pdf is then found by normalizing the k-dimensional integral of $P(x,n)$ to one:

$$p(f_1, f_2, \ldots, f_k) = \frac{P(x, n)}{\int_0^1 \cdots \int_0^1 \int_0^1 P(x, n) df_1 df_2 \ldots df_k}. \quad (15)$$

Finally, the confidence that $a_i \leq f_i \leq b_i$ for i=1, . . . , k is given by:

$$\int_{a_k}^{b_k} \cdots \int_{a_2}^{b_2} \int_{a_1}^{b_1} p(f_1, f_2, \ldots, f_k) df_1 df_2 \ldots df_k. \quad (16)$$

Non-Prognosticable Failure Modes

Finally, the case of non-prognosticable failure modes is considered. A non-prognosticable failure mode is simply a failure mode for which there is no prognostic algorithm in place to predict remaining useful life. Note, the lack of a prognostic algorithm need not imply that such an algorithm could not be developed, only that it isn't in place for the component being analyzed. Further, it is reasonable that many failure modes of a component may not have prognostic algorithms due to the relative infrequency of occurrence of the failure modes or a lack of technical understanding to develop such algorithms. All of these non-prognosticable failure modes can, for the purposes of this analysis, be combined into a single non-prognosticable failure mode with a composite MTBF given by:

$$MTBF_{non-prognosable} = (\Sigma MTBF^{-1})^{-1}, \quad (17)$$

where the summation is taken over all non-prognosticable failure modes.

The non-prognosticable failure mode can be characterized as a failure mode where $f=0$. That is, there is zero probability that the failure mode will be predicted before that failure mode occurs. Further, this value of f is not probabilistic, but is instead deterministic with value zero, so it should not be included as a variable in the joint pdf. The effect of this characterization is to alter the calculation of the total probability function, $P(x,n)$.

Without loss of generality, let the non-prognosticable failure mode be listed as the last (or $k^{th}$) failure mode. Thus, $f_k=0$. Now consider the term $P(x_k, n_k | m_k)$ which occurs in the calculation of $P(x,n)$. This term is given by:

$$P(x_k, n_k | m_k) = \binom{n_k}{x_k}(1-f_k)^{x_k} f_k^{n_k-x_k} \quad (18)$$

$$= \frac{n_k!}{(n_k-x_k)!x_k!}(1-0)^{x_k} 0^{n_k-x_k}$$

$$= \frac{n_k!}{(n_k-x_k)!x_k!} 0^{n_k-x_k}.$$

From the constraints mentioned in Section [00058], $n_k$ must be greater than or larger than $x_k$, so consider the two cases $n_k=x_k$ and $n_k>x_k$ (recalling that $0!=0^0=1$):

$$P(x_k, n_k | m_k) = \begin{cases} 1, & n_k = x_k \\ 0, & n_k > x_k. \end{cases} \quad (19)$$

This is consistent with the earlier characterization that a non-prognosticable failure mode misses all occurrences of that failure mode (that is, when $n_k=x_k$ the probability is one). And for any case where fewer than all of the non-prognosticable failure modes are missed ($n_k>x_k$), the probability is zero.

IMPLICATIONS

Tabulation

The overall confidence equation $$\left(\int_a^b (n+1)\binom{n}{x}(1-f)^x f^{n-x} df\right),$$

discussed in U.S. patent application Ser. No. 12/358,124, now U.S. Pat. No. 8,201,424 can be used when considering the verification of an overall requirement for a given component (as opposed to the multiple failure mode confidence equation given as Eq. 16). The evaluation of the integral in the overall confidence equation does have a closed-form solution, as derived in Appendix A. For values of x greater than one, the general solution is:

$$\int_a^b (n+1)\binom{n}{x}(1-f)^x f^{n-x} df = \quad (20)$$

$$(n+1)\binom{n}{x}\left\{\frac{(1-b)^x b^{n-x+1} - (1-a)^x a^{n-x+1}}{n-x+1} + \sum_{i=2}^{x}\left[\left(\prod_{j=1}^{i-1}\frac{x-j+1}{n-x+j}\right)\right.\right.$$
$$\left.\left.\left(\frac{(1-b)^{x-i+1} b^{n-x+i} - (1-a)^{x-i+1} a^{n-x+i}}{n-x+i}\right)\right]\right\} +$$

$$b^{n+1} - a^{n+1}.$$

For the two degenerate cases ($x=0$, $x=1$), the integral simplifies to:

$$\int_a^b (n+1)\binom{n}{x}(1-f)^x f^{n-x} df = \quad (21)$$

$$\begin{cases} b^{n+1} - a^{n+1}, & x = 0 \\ (n+1)[(1-b)b^n - (1-a)a^n] + b^{n+1} - a^{n+1}, & x = 1. \end{cases}$$

Figure 9:
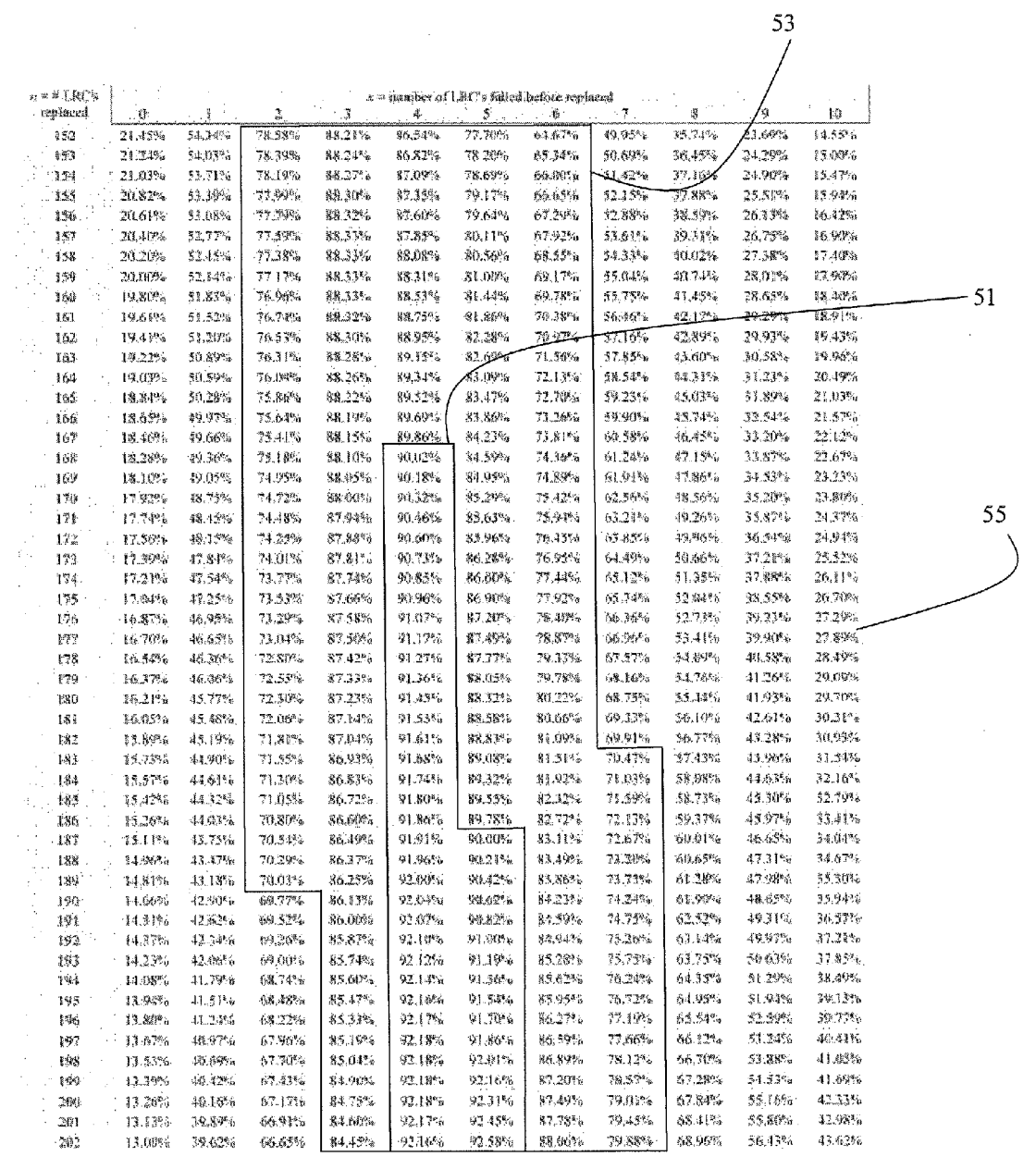

This closed form of the solution (Eq. (20)), though unwieldy to write down, is generally quicker (and more accurate) to calculate than to evaluate the integral using numerical techniques. Note that the equation does not depend on what component is being prognosed or how the algorithm makes its prediction. In fact, the only part that varies from algorithm to algorithm is the limits on the integration ("a" and "b"). Thus, for selected values of the lower bound ("a") and upper bound ("b"), the equation can be pre-calculated and tabulated for all possible values of n and x (up to some maximum, of course). Select portions of such a tabulation for a=95% and b=99% are shown in FIG. 9. In this way, tabulations of the results of the overall confidence equation can be pre-calculated and stored instead of performing the complex calculation every time a value is needed. As described in more detail below, this can beneficially allow maintainers to readily review the status of whether or not the combination of algorithms are valid or have failed.

Minimum Amount of Data Required for Verification

It is often desirable to know just how much data will be required to verify a requirement. Such knowledge can be useful when scheduling and allocating resources to the verification task. To show how this information can be derived from this verification technique, consider an electro-mechanical actuator with the following prognostic requirement:

The prognostic algorithm shall provide a minimum of 20 hours time-to-maintenance such that between 95% and 99% of failures of the EMA will be avoided with 90% confidence.

A portion of the confidence tabulation for this requirement is illustrated in FIG. 9. The cells which correspond to confidence values greater than or equal to 90% are highlighted at region 51. As can be seen, the more failures that occur, the more replacements must have been performed to meet the requirement. Also, for some numbers of failures, there is no number of replacements which will satisfy the requirement. For example, the least number of replacements that can conceivably be used to verify the requirement is 168, but only if there have been four failures in those 168 replacements. Table 2 shows the minimum number of replacements required for verification for a given number of failure occurrences.

These numbers, combined with the predicted reliability failure rate, can give a minimum value for the amount of data required and the time required to verify a prognostic algorithm. Unfortunately, these values are only minimum values.

TABLE 2

Minimum Number of Replacements Required For Verification

| No. of Failures | Minimum No. of Replacements Required |
|---|---|
| 0-3 | N/A |
| 4 | 168 |
| 5 | 187 |
| 6 | 210 |
| 7 | 234 |
| 8 | 257 |
| 9 | 281 |
| 10 | >300 |

Figure 10:
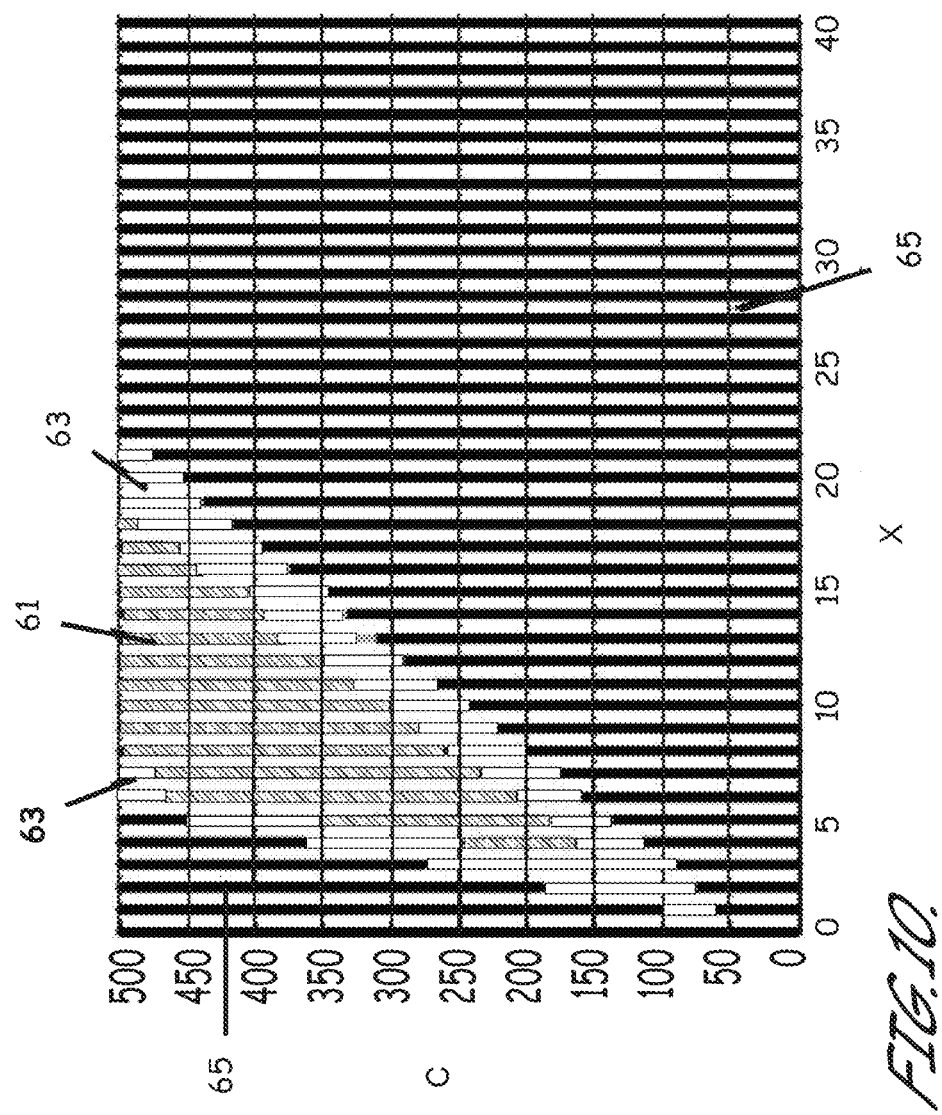
FIG. 10 is a graph illustrating a confidence region chart according to an embodiment of the present invention.

FIG. 10 illustrates a confidence region chart which provides an arguably more intuitive methodology of displaying the confidence regions of FIG. 9 based on the exemplary data. The confidence region chart shows the confidence level associated with a given number of failures out of a given number of replacements. In the chart, x shows the total number of failures and n shows the total number of replacements. For a given confidence level, if there are x number of failures of an installed component, there must have been n number of replacements. Thus n minus x shows the number of replacements based on the algorithm. The first region 61 shows a 90 percent confidence prediction that the algorithm will avoid 95 percent of failures and allow one percent of failures. In the second region 63, the confidence level drops to 70 percent. This equates to region 53 in FIG. 9. The third region 65 shows a less than 70 percent confidence. This equates to region 55 in FIG. 9.

As can be seen, for some values of x at 65, there is no value of n which can be shown to satisfy the requirements. Moreover, consider the case where x=4. The prognostic requirement is satisfied only if n is between 168 and 237. Thus, if the prognostic algorithm or algorithms are too conservative (and there have been more than 237 replacements for only 4 failures), the confidence will drop below the threshold. Thus, a requirements statement, written as shown above, is not only verifiable from maintenance record data, but it also provides a means of identifying algorithms which are potentially too conservative in their time-to-maintenance predictions.

Confidence Growth Curves

Figure 11:
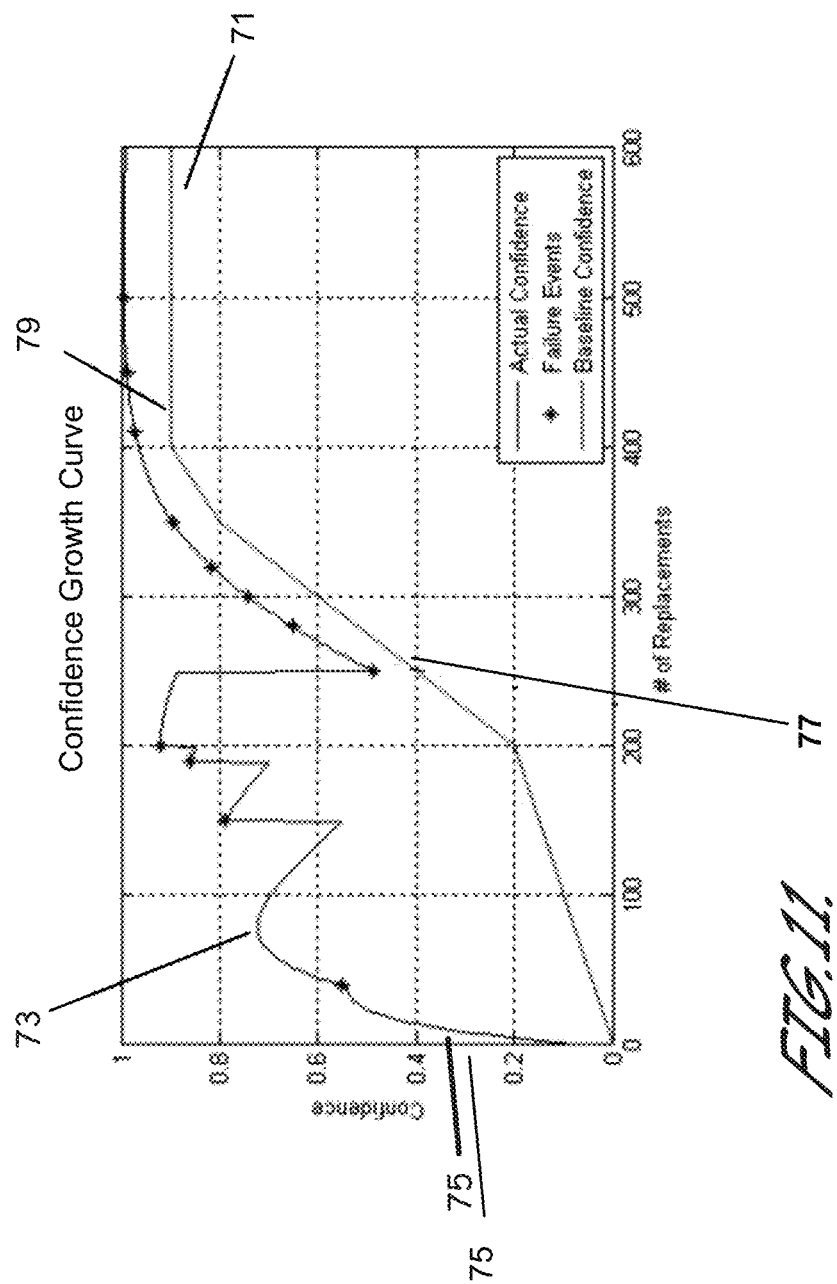
FIG. 11 is a graph illustrating a confidence growth curve according to an embodiment of the present invention.

FIG. 11 provides an example of a confidence growth curve for a prognostic algorithm. The bottom line in the figure illustrates a baseline confidence curve 71. The upper line in the figure illustrates the actual confidence growth curve 73 which is adjusted as additional data becomes available. The black asterisks indicate 'missed' failures—i.e., failures which occurred before the indicated time-to-maintenance. For this example, it is assumed that failures occur at the 40th, 150th, 190th, 200th, 250th, 280th, 300th, 320th, 350th, 410th, 450th, and 500th replacements, with all other replacements being scheduled in accordance with a prognostic algorithm time-to-maintenance prediction. Note, the confidence values used were taken from the table partially illustrated in FIG. 9.

As illustrated in the figure, the confidence starts out low 75 and tends to increase as more data points are acquired. When a failure event occurs and the associated un-predicted maintenance replacement is performed, the confidence drops 77. The drops are more significant in the beginning when there are few data points. However, as the number of replacements increases, the effect of a failure event on the confidence curve is dampened.

The confidence growth curve 73, along with a baseline confidence curve 71, can be used to bound the time and data required for verification, as well as to provide a means of declaring a verification has failed. The baseline confidence 71 curve is a minimum confidence bound for the actual confidence curve 73. The shape of the baseline curve 71 would be specified based on specific knowledge of the requirements being verified. In general, though, it would tend to be pessimistic initially to allow for large swings in the confidence.

In order for the requirements to be verified, it would not only have to reach the desired confidence, but also do so without going below the baseline curve 71. If the actual confidence does dip below the baseline curve 71, the verification could be considered failed. An added benefit of the approach is that the baseline curve can constrain how much time is available for an algorithm to reach verification. For example, in FIG. 11, the baseline confidence requires that the algorithm reaches verification (90% confidence) no later than by the 400th replacement at 79.

The confidence growth curve can also be used to determine when verification can be fairly assessed when the vendor has only recently initiated application of prognostic algorithms designed to meet a newly implemented prognostic algorithm requirement statement. When and if the confidence curve reaches a pre-determined threshold of acceptance, verification can start being performed.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions described with respect to the program product, and the computer executable portions of the method steps according to the various embodiments of a method of performing a verification of satisfaction of requirements of a prognostic algorithm requirements statement to monitor management of component part replacement for a vehicle or other device, described above.

Various embodiments of the present invention provide several advantages. For example, the above described methodologies provide rigorous approaches to writing vendor requirements with respect to component prognostics and verification so that the requirements are met. As described above, maintenance of vehicles or other integrated devices such as, for example, certain types of aircraft may have a requirement that all life-limited components be replaced based on condition or state of health rather than on a time change interval. If the maintainer waits until the part breaks, a mission may be compromised and mission availability affected. This, in turn, may affect profit margins in a performance-based contract. If the part is replaced on a time change interval, life cycle costs will increase, and again, affect profits in a Performance Based Logistics (PBL) type contract. This methodology provides rigorous approaches to writing vendor requirements with respect to component prognostics and verification that the requirements are met. As no such methodology exists, the various embodiments of the present invention provide a significant advantage with regard to PBL type contracts and overall air vehicle reliability.

Figure 12:
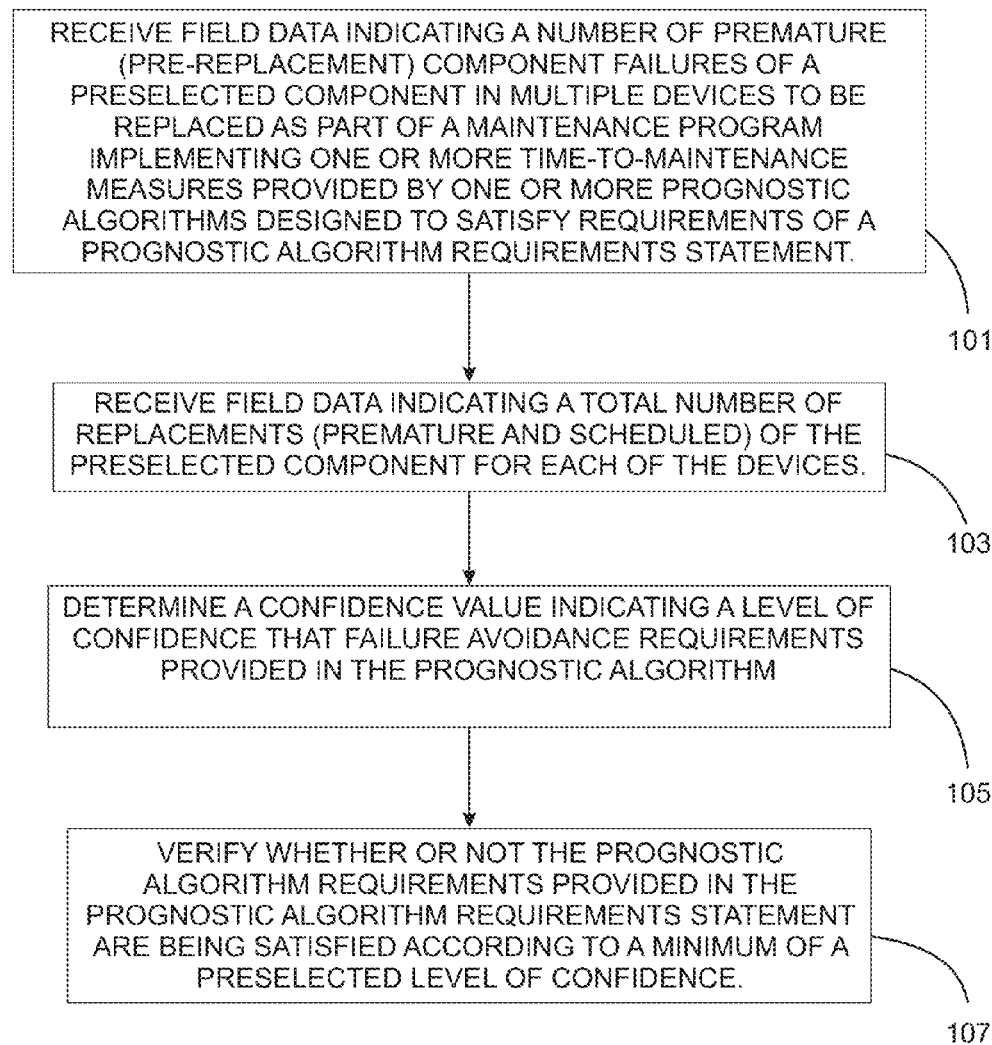
FIG. 12 is a block flow diagram illustrating a method of performing a verification of satisfaction of requirements of a prognostic algorithm requirements statement to monitor management of component part replacement for a device, according to an embodiment of the invention.

Referring to FIG. 12, for example, an embodiment of a method/process of performing a verification of satisfaction of requirements of a prognostic algorithm requirements statement to monitor management of component part replacement for a device, can include, the step of: receiving field data indicating a number of component failures of a preselected component contained in each of a plurality of devices occurring prior to replacement as part of a maintenance program implementing one or more time-to-maintenance measures provided by a corresponding one or more prognostic algorithms designed to satisfy requirements indicated in the prognostic algorithm requirements statement, and indicating a total number of replacements of the preselected component for each of the plurality of devices (block 101). The method/process can also include, responsive to the field data, determining a confidence value indicating a level of confidence that failure avoidance requirements provided in the prognostic algorithm requirements statement are being met (block 103), and responsive to the determined confidence value, verifying whether or not the prognostic algorithm requirements provided in the prognostic algorithm requirements statement are being satisfied according to a minimum of a preselected level of confidence (block 105). The method/process can further include verifying whether or not the prognostic algorithm requirements provided in the prognostic algorithm requirements statement are being satisfied according to a minimum of a preselected level of confidence (block 107.

Figure 13:
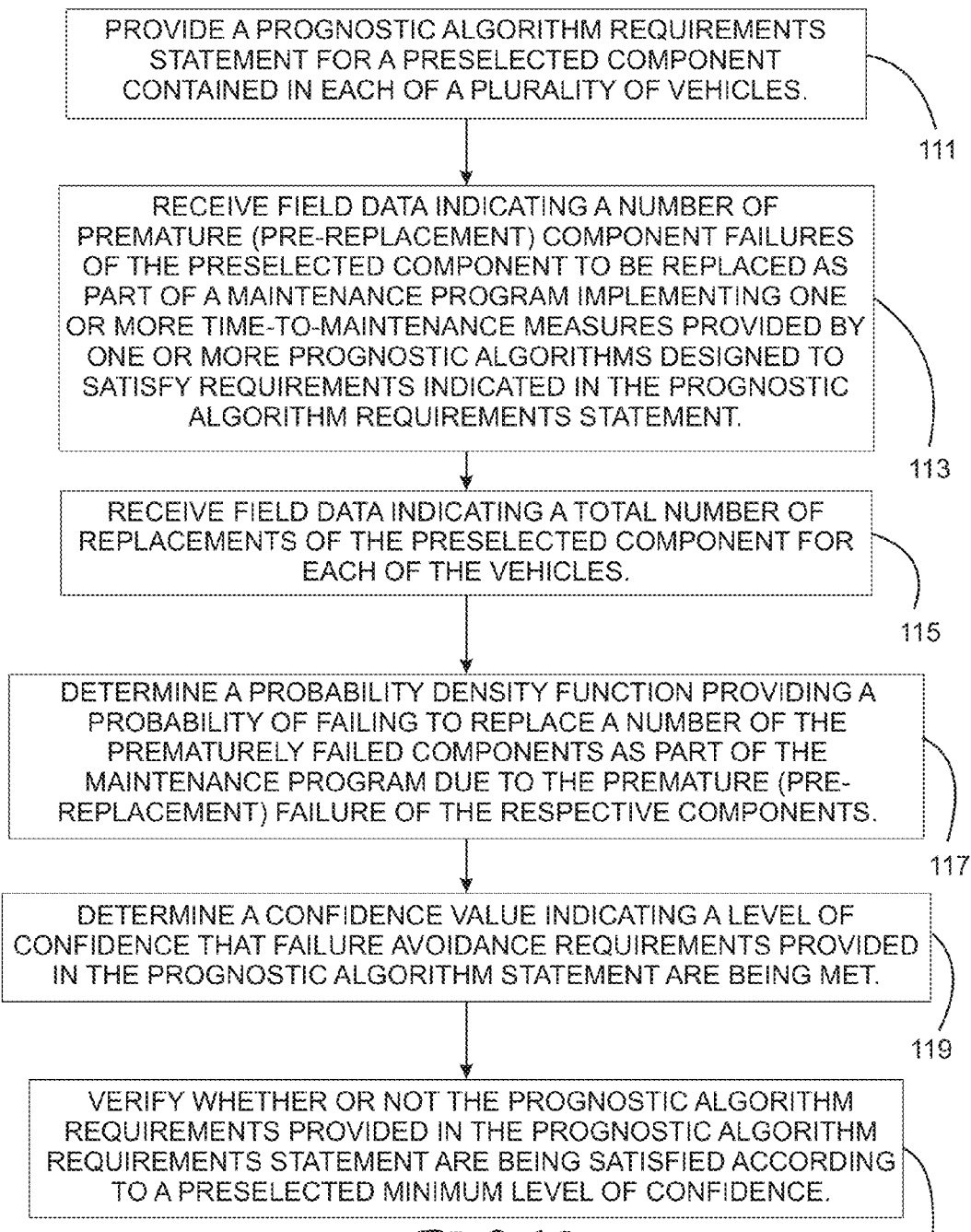
FIG. 13 is a block flow diagram illustrating a method of performing a verification of satisfaction of requirements of a prognostic algorithm requirements statement to monitor management of component part replacement for a vehicle, according to an embodiment of the invention.

Referring to FIG. 13, another example of an embodiment of a method/process of performing a verification of satisfaction of requirements of a prognostic algorithm requirements statement to monitor management of component part replacement for a vehicle, can include the steps (or operations) of: providing a prognostic algorithm requirements statement for a preselected component contained in each of a plurality of vehicles (block 111); and receiving field data indicating a number of component failures of the preselected component contained in each of the plurality of vehicles occurring prior to replacement as part of a maintenance program implementing one or more time-to-maintenance measures provided by a corresponding one or more prognostic algorithms designed to satisfy requirements indicated in the prognostic algorithm requirements statement (block 113); and indicating a total number of replacements of the preselected component for each of the plurality of vehicles (block 115). The steps can also include determining a probability density function providing a probability of failing to replace a number of the preselected components as part of the maintenance program due to failure of the respective components before being replaced according to the one or more time-to-maintenance measures provided by the corresponding one or more prognostic algorithms designed to satisfy requirements indicated in the prognostic algorithm requirements statement (block 117); and responsive to the determined probability density function, determining a confidence value indicating a level of confidence that failure avoidance requirements provided in the prognostic algorithm statement are being met (block 119). The steps can further include responsive to the determined confidence value, verifying whether or not the prognostic algorithm requirements provided in the prognostic algorithm requirements statement are being satisfied according to a preselected minimum level of confidence (block 120).

Figure 14:
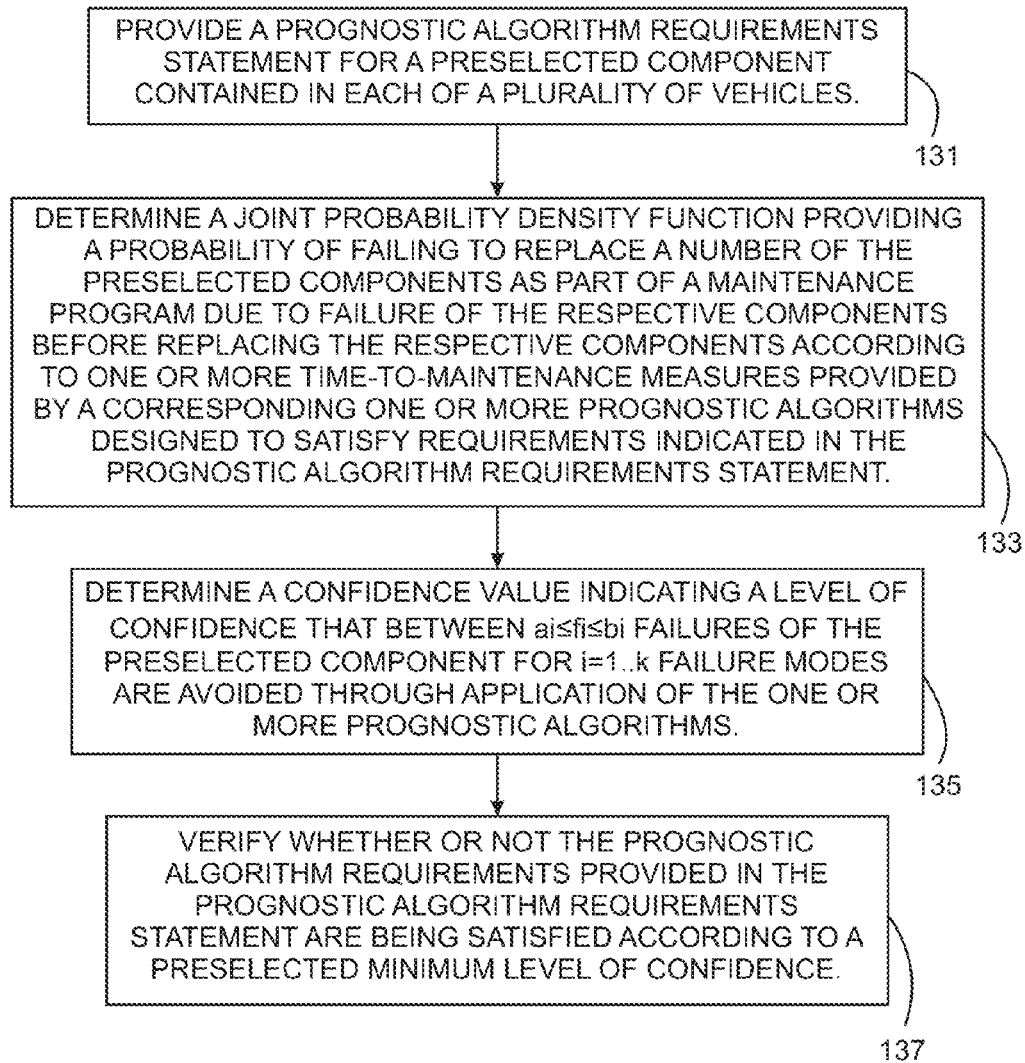
FIG. 14 is a block flow diagram illustrating a method of performing a verification of satisfaction of requirements of a prognostic algorithm requirements statement to monitor management of component part replacement for a vehicle, according to an embodiment of the present invention.

Referring to FIG. 14, another example of an embodiment of a method/process of performing a verification of satisfaction of requirements of a prognostic algorithm requirements statement to monitor management of component part replacement for a vehicle, can include the steps (operations) of: providing a prognostic algorithm requirements statement for a preselected component contained in each of a plurality of vehicles (block 131); determining a joint probability density function providing a probability of failing to replace a number of the preselected components as part of a maintenance program due to failure of the respective components before replacing the respective components according to one or more time-to-maintenance measures provided by a corresponding one or more prognostic algorithms designed to satisfy requirements indicated in the prognostic algorithm requirements statement (block 133); and responsive to the determined joint probability density function, determining a confidence value indicating a level of confidence that between $a_i \le f_i \le b_i$ failures of the preselected component for $i=1 \ldots k$ failure modes are avoided through application of the one or more prognostic algorithms, wherein $f_i$ is a percentage of failures for failure mode i that would be avoided by performing maintenance according to the one or more time-to-maintenance measures provided by a corresponding one or more prognostic algorithms designed to satisfy requirements indicated in the prognostic algorithm requirements statement, wherein $a_i$ is the lower bound of $f_i$ percentage of failures for failure mode i, and $b_i$ is the upper bound of $f_i$ percentage of failures for failure mode i (block 135). The steps can also include, responsive to the determined confidence value, verifying whether or not the prognostic algorithm requirements provided in the prognostic algorithm requirements statement are being satisfied according to a preselected minimum level of confidence (137).

Figure 15:
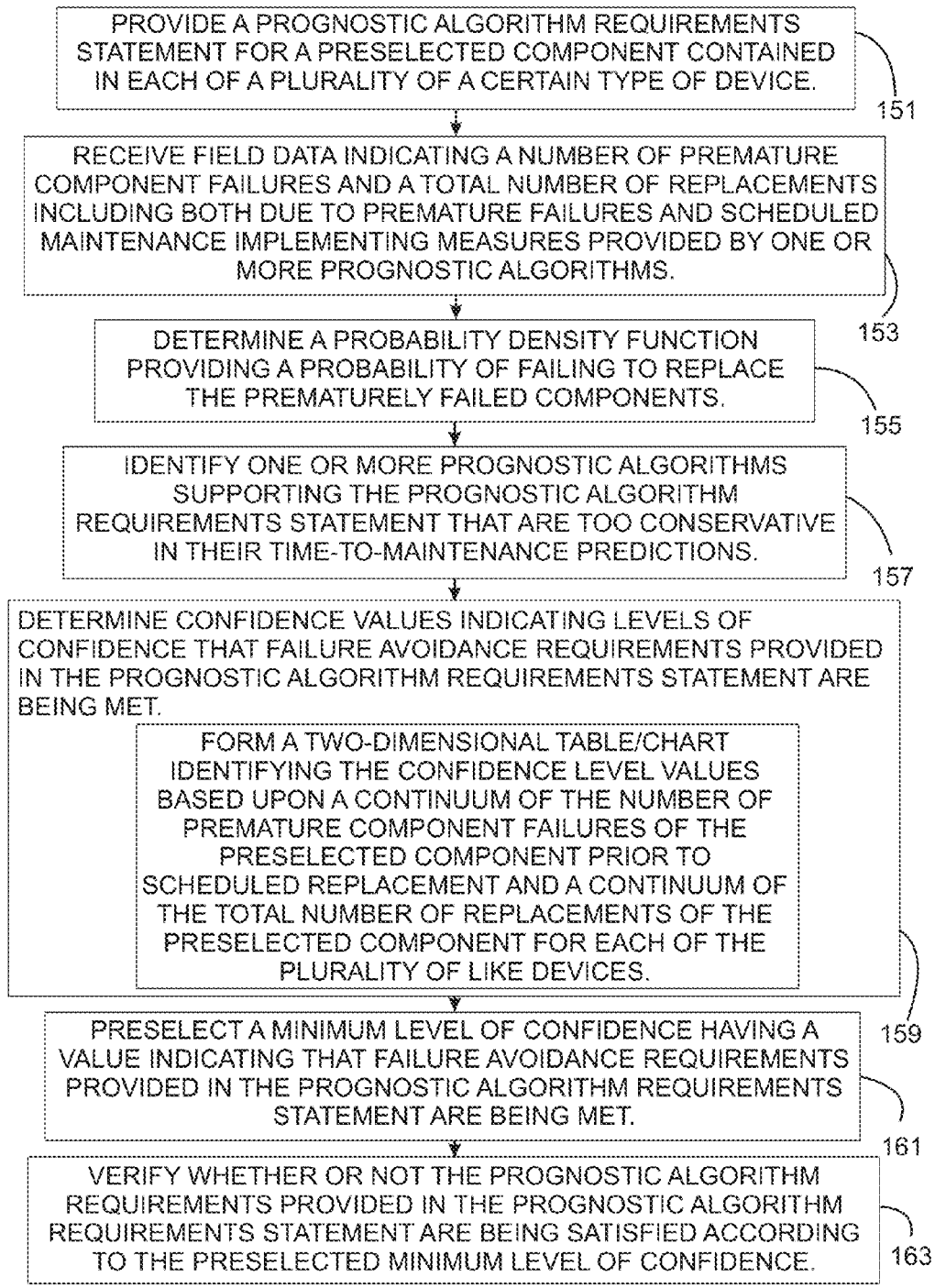
FIG. 15 is a block flow diagram illustrating a method of performing a verification of satisfaction of requirements of a prognostic algorithm requirements statement to monitor management of component part replacement for a vehicle, according to an embodiment of the present invention.

Referring to FIG. 15, another example of an embodiment of a method/process of performing a verification of satisfaction of requirements of a prognostic algorithm requirements statement to monitor management of component part replacement for a vehicle, can include the steps of: providing a prognostic algorithm requirements statement for a preselected component contained in each of a plurality of a certain type of device (block 151); receiving field data indicating a number of premature component failures and a total number of replacements including both due to premature failures and scheduled maintenance implementing measures provided by one or more prognostic algorithms (block 153); determining a probability density function providing a probability of failing to replace the prematurely failed components (block 155); identifying one or more prognostic algorithms supporting the prognostic algorithm requirements statement that are too conservative in their time-to-maintenance predictions (block 157); and determining confidence values indicating levels of confidence that failure avoidance requirements provided in the prognostic algorithm requirements statement are being met (block 159). This can include performing a two-dimensional table/chart identifying the confidence level values based upon a continuum of the number of premature component failures of the preselected component prior to scheduled replacement and a continuum of the total number of replacements of the preselected component for each of the plurality of like devices.

The method/process can also include preselecting a minimum level of confidence having a value indicating that failure avoidance requirements provided in the prognostic algorithm requirements statement are being met (block 161; and verifying whether or not the prognostic algorithm requirements provided in the prognostic algorithm requirements statement are being satisfied according to the preselected minimum level of confidence (block 163).

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

APPENDIX A $$\int_a^b (n+1)\binom{n}{x}(1-f)^x f^{n-x} df = (n+1)\binom{n}{x}\int_a^b \underbrace{(1-f)^x}_{u} \underbrace{f^{n-x} df}_{dv} =$$

$$(n+1)\binom{n}{x}\left[\frac{(1-f)^x f^{n-x+1}}{n-x+1}\bigg|_{f=a}^b - \int_a^b \frac{-x}{n-x+1}(1-f)^{x-1} f^{n-x+1} df\right] =$$

$$(n+1)\binom{n}{x}\left[\left(\frac{(1-b)^x b^{n-x+1}}{n-x+1} - \frac{(1-a)^x a^{n-x+1}}{n-x+1}\right) - \int_a^b \frac{-x}{n-x+1}(1-f)^{x-1} f^{n-x+1} df\right] =$$

$$(n+1)\binom{n}{x}\left(\frac{(1-b)^x b^{n-x+1}}{n-x+1} - \frac{(1-a)^x a^{n-x+1}}{n-x+1}\right) +$$

$$(n+1)\binom{n}{x}\int_a^b \frac{x}{n-x+1}(1-f)^{x-1} f^{n-x+1} df =$$

$$(n+1)\binom{n}{x}\left(\frac{(1-b)^x b^{n-x+1}}{n-x+1} - \frac{(1-a)^x a^{n-x+1}}{n-x+1}\right) +$$

$$(n+1)\binom{n}{x}\left(\frac{x}{n-x+1}\right)\int_a^b \underbrace{(1-f)^{x-1}}_{u} \underbrace{f^{n-x+1} df}_{dv} =$$

$$(n+1)\binom{n}{x}\left(\frac{(1-b)^x b^{n-x+1}}{n-x+1} - \frac{(1-a)^x a^{n-x+1}}{n-x+1}\right) + (n+1)\binom{n}{x}$$

$$\left(\frac{x}{n-x+1}\right)\left[\left(\frac{(1-b)^{x-1} b^{n-x+2}}{n-x+2} - \frac{(1-a)^{x-1} a^{n-x+2}}{n-x+2}\right) +\right.$$

$$\left.\left(\frac{x-1}{n-x+2}\right)\int_a^b (1-f)^{x-2} f^{n-x+2} df\right] =$$

$$(n+1)\binom{n}{x}\left(\frac{(1-b)^x b^{n-x+1}}{n-x+1} - \frac{(1-a)^x a^{n-x+1}}{n-x+1}\right) + (n+1)$$

$$\binom{n}{x}\left(\frac{x}{n-x+1}\right)\left(\frac{(1-b)^{x-1} b^{n-x+2}}{n-x+2} - \frac{(1-a)^{x-1} a^{n-x+2}}{n-x+2}\right) +$$

$$(n+1)\binom{n}{x}\left(\frac{x}{n-x+1}\right)\left(\frac{x-1}{n-x+2}\right)\int_a^b \underbrace{(1-f)^{x-2}}_{u} \underbrace{f^{n-x+2} df}_{dv} =$$

$$\vdots = (n+1)\binom{n}{x}\left(\frac{(1-b)^x b^{n-x+1}}{n-x+1} - \frac{(1-a)^x a^{n-x+1}}{n-x+1}\right) +$$

-continued $$(n+1)\binom{n}{x}\sum_{i=2}^k\left[\left(\prod_{j=1}^{i-1}\frac{x-j+1}{n-x+j}\right)\left(\frac{(1-b)^{x-i+1} b^{n-x+i} - (1-a)^{x-i+1} a^{n-x+i}}{n-x+i}\right)\right] + (n+1)\binom{n}{x}\left(\frac{x}{n-x+1}\right)$$

$$\left(\frac{x-1}{n-x+2}\right)\cdots\left(\frac{x-(k-1)}{n-x+k}\right)\int_a^b \underbrace{(1-f)^{x-k}}_{u} \underbrace{f^{n-x+k} df}_{dv} =$$

$$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^x\left[\left(\prod_{j=1}^{i-1}\frac{x-j+1}{n-x+j}\right)\right.$$

$$\left.\left(\frac{(1-b)^{x-i+1} b^{n-x+1} - (1-a)^{x-i+1} a^{n-x+i}}{n-x+i}\right)\right] +$$

$$(n+1)\binom{n}{x}\left(\frac{x}{n-x+1}\right)\left(\frac{x-1}{n-x+2}\right)\cdots$$

$$\left(\frac{1}{n}\right)\int_a^b (1-f)^0 f^n df =$$

$$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^x\left[\left(\prod_{j=1}^{i-1}\frac{x-j+1}{n-x+j}\right)\right.$$

$$\left.\left(\frac{(1-b)^{x-i+1} b^{n-x+1} - (1-a)^{x-i+1} a^{n-x+i}}{n-x+i}\right)\right] +$$

$$(n+1)\binom{n}{x}\left(\frac{x}{n-x+1}\right)\left(\frac{x-1}{n-x+2}\right)\cdots\left(\frac{1}{n}\right)\int_a^b f^n df =$$

$$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^x\left[\left(\prod_{j=1}^{i-1}\frac{x-j+1}{n-x+j}\right)\right.$$

$$\left.\left(\frac{(1-b)^{x-i+1} b^{n-x+i} - (1-a)^{x-i+1} a^{n-x+i}}{n-x+i}\right)\right] +$$

$$(n+1)\binom{n}{x}\left(\frac{x}{n-x+1}\right)\left(\frac{x-1}{n-x+2}\right)$$

$$\cdots\left(\frac{1}{n}\right)\left(\frac{1}{n+1}\right)f^{n+1}\bigg|_{f=a}^b =$$

$$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^x\left[\left(\prod_{j=1}^{i-1}\frac{x-j+1}{n-x+j}\right)\right.$$

$$\left.\left(\frac{(1-b)^{x-i+1} b^{n-x+i} - (1-a)^{x-i+1} a^{n-x+i}}{n-x+i}\right)\right] +$$

$$(n+1)\binom{n}{x}\left(\frac{x}{n-x+1}\right)\left(\frac{x-1}{n-x+2}\right)\cdots$$

$$\left(\frac{1}{n}\right)\left(\frac{1}{n+1}\right)(b^{n+1}-a^{n+1}) =$$

-continued $$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^{x}\left[\left(\prod_{j=1}^{i-1}\frac{x-j+1}{n-x+j}\right)\right.$$

$$\left.\left(\frac{(1-b)^{x-i+1} b^{n-x+i} - (1-a)^{x-i+1} a^{n-x+i}}{n-x+i}\right)\right] +$$

$$(n+1)\left(\frac{n!}{(n-x)!x!}\right)\left(\frac{(n-x)!x!}{n!}\right)$$

$$\left(\frac{1}{n+1}\right)(b^{n+1} - a^{n+1}) =$$

$$(n+1)\binom{n}{x}\left(\frac{(1-b)^x b^{n-x+1} - (1-a)^x a^{n-x+1}}{n-x+1}\right) +$$

$$(n+1)\binom{n}{x}\sum_{i=2}^{x}\left[\left(\prod_{j=1}^{i-1}\frac{x-j+1}{n-x+j}\right)\right.$$

$$\left.\left(\frac{(1-b)^{x-i+1} b^{n-x+i} - (1-a)^{x-i+1} a^{n-x+i}}{n-x+i}\right)\right] +$$

$$(b^{n+1} - a^{n+1}) = (n+1)\binom{n}{x}$$

$$\left\{\frac{(1-b)^x b^{n-x+1} - (1-a)^x a^{n-x+1}}{n-x+1} + \right.$$

$$\sum_{i=2}^{x}\left[\left(\prod_{j=1}^{i-1}\frac{x-j+1}{n-x+j}\right)\right.$$

$$\left.\left.\left(\frac{(1-b)^{x-i+1} b^{n-x+i} - (1-a)^{x-i+1} a^{n-x+i}}{n-x+i}\right)\right]\right\}$$

$$+ (b^{n+1} - a^{n+1})$$

Note that the above derivation is valid only for $x \geq 2$. The solutions for $x=1$ and $x=0$ are shown next.

Case $x=1$:

$$\int_a^b (n+1)\binom{n}{1}(1-f)^1 f^{n-1} df = (n+1)\left(\frac{n!}{(n-1)!1!}\right)\int_a^b \underbrace{(1-f)}_{u}\underbrace{f^{n-1} df}_{dv}$$

$$= (n+1)\left(\frac{n(n-1)!}{(n-1)!}\right)\left[\frac{(1-f)f^n}{n}\bigg|_{f=a}^{b} - \int_a^b \frac{-1}{n} f^n df\right]$$

$$= (n+1)(n)\left[\left(\frac{(1-b)b^n}{n} - \frac{(1-a)a^n}{n}\right) + \frac{1}{n}\int_a^b f^n df\right]$$

$$= (n+1)\left[(1-b)b^n - (1-a)a^n + \frac{f^{n+1}}{n+1}\bigg|_{f=a}^{b}\right]$$

$$= (n+1)\left[\begin{array}{l}(1-b)b^n - (1-a)a^n + \\ \left(\frac{b^{n+1} - a^{n+1}}{n+1}\right)\end{array}\right]$$

$$= (n+1)[(1-b)b^n - (1-a)a^n] + b^{n+1} - a^{n+1}$$

Case $x=0$:

$$\int_a^b (n+1)\binom{n}{0}(1-f)^0 f^{n-0} df = (n+1)\left(\frac{n!}{(n-0)!0!}\right)\int_a^b f^n df$$

$$= (n+1)\left(\frac{n!}{(n!)(1)}\right)\int_a^b f^n df$$

$$= (n+1)\left[\frac{f^{n+1}}{n+1}\bigg|_{f=a}^{b}\right]$$

$$= (n+1)\left[\frac{b^{n+1} - a^{n+1}}{n+1}\right]$$

$$= b^{n+1} - a^{n+1}$$

Combining the above results yields the following general solution:

$$\int_a^b (n+1)\binom{n}{x}(1-f)^x f^{n-x} df =$$

$$\begin{cases} b^{n+1} - a^{n+1}, & x=0 \\ (n+1)[(1-b)b^n - (1-a)a^n] + b^{n+1} - a^{n+1}, & x=1 \\ (n+1)\binom{n}{x}\left\{\begin{array}{l}\left(\frac{(1-b)^x b^{n-x+1} - (1-a)^x a^{n-x+1}}{n-x+1}\right) + \\ \sum_{i=2}^{x}\left[\left(\prod_{j=1}^{i-1}\frac{x-j+1}{n-x+j}\right)\left(\frac{(1-b)^{x-i+1} b^{n-x+i} -}{n-x+i}\right)\right]\end{array}\right\} + \\ \quad b^{n+1} - a^{n+1}, & x \geq 2 \end{cases}$$

That claimed is:

1. A method of performing a verification of satisfaction of requirements of a prognostic algorithm requirements statement to monitor management of component part replacement for a device, the method comprising the steps of:
   receiving field data indicating a number of component failures of a preselected component contained in each of a plurality of devices occurring prior to replacement as part of a maintenance program implementing one or more time-to-maintenance measures provided by a corresponding one or more prognostic algorithms designed to satisfy requirements indicated in the prognostic algorithm requirements statement, and indicating a total number of replacements of the preselected component for each of the plurality of devices;
   responsive to the field data, determining a confidence value indicating a level of confidence that failure avoidance requirements provided in the prognostic algorithm requirements statement are being met;
   responsive to the determined confidence value, verifying whether or not the prognostic algorithm requirements provided in the prognostic algorithm requirements statement are being satisfied according to a minimum of a preselected level of confidence; and
   making a real-time mission decision based on the step of verifying whether or not the prognostic algorithm requirements provided in the prognostic algorithm requirements statement are being satisfied according to a minimum of a preselected level of confidence.

2. The method as defined in claim 1, wherein each of the plurality of devices is an aircraft containing at least one preselected component.

3. The method as defined in claim 1, further comprising the step of forming a two-dimensional table or chart identifying confidence level values based upon a continuum of the number of component failures of the preselected component prior to scheduled replacement and a continuum of the total number of replacements of the preselected component for each of the plurality of devices.

4. The method as defined in claim 3, further comprising the step of identifying one or more prognostic algorithms supporting the prognostic algorithm requirements statement that are too conservative in their time-to-maintenance predictions.

5. The method as defined in claim 1, further comprising the step of providing the prognostic algorithm requirements statement for the preselected component contained in each of the plurality of devices.

6. The method as defined in claim 5, wherein the prognostic algorithm requirement statement is provided in a form at least substantially similar to the following: the prognostic algorithm or algorithms shall provide a minimum of <TTM> hours time-to-maintenance such that between <LOWER>% and <UPPER>% of failures of <COMPONENT NAME> will be avoided with <LEVEL>% confidence.

7. The method as defined in claim 5, wherein the prognostic algorithm requirement statement is provided in a form at least substantially similar to the following: the prognostic algorithm or algorithms shall provide a minimum of <TTM> hours time-to-maintenance such that between <LOWER_x>% and <UPPER_x>% of <FAILURE_MODE_x> failures of <COMPONENT NAME> for each of x=1 to n plurality of failure modes will be avoided with <LEVEL>% confidence.

8. The method as defined in claim 1, further comprising the step of determining a probability density function providing a probability of failing to replace a number of the preselected components as part of the maintenance program due to failure of the respective components before being replaced according to the one or more time-to-maintenance measures provided by the corresponding one or more prognostic algorithms designed to satisfy requirements indicated in the prognostic algorithm requirements statement.

9. The method as defined in claim 8, wherein the step of determining a probability density function comprises determining a joint probability density function for a plurality of failure modes each associated with the preselected component.

10. The method as defined in claim 8, wherein the step of determining a confidence value comprises determining a confidence value that accounts for individual prognostic algorithm requirements for each of a plurality of failure modes each associated with the preselected component.

11. The method as defined in claim 10, wherein the step of determining a confidence value includes accounting for one or more non-prognosticable failure modes.

12. A method of performing a verification of satisfaction of requirements of a prognostic algorithm requirements statement to monitor management of component part replacement for a vehicle, the method comprising the steps of:

providing a prognostic algorithm requirements statement for a preselected component contained in each of a plurality of vehicles;

receiving field data indicating a number of component failures of the preselected component contained in each of the plurality of vehicles occurring prior to replacement as part of a maintenance program implementing one or more time-to-maintenance measures provided by a corresponding one or more prognostic algorithms designed to satisfy requirements indicated in the prognostic algorithm requirements statement, and indicating a total number of replacements of the preselected component for each of the plurality of vehicles;

determining a probability density function providing a probability of failing to replace a number of the preselected components as part of the maintenance program due to failure of the respective components before being replaced according to the one or more time-to-maintenance measures provided by the corresponding one or more prognostic algorithms designed to satisfy requirements indicated in the prognostic algorithm requirements statement;

responsive to the determined probability density function, determining a confidence value indicating a level of confidence that failure avoidance requirements provided in the prognostic algorithm statement are being met;

responsive to the determined confidence value, verifying whether or not the prognostic algorithm requirements provided in the prognostic algorithm requirements statement are being satisfied according to a preselected minimum level of confidence; and making a real-time mission decision based on the step of verifying whether or not the prognostic algorithm requirements provided in the prognostic algorithm requirements statement are being satisfied according to a minimum of a preselected level of confidence.

13. The method as defined in claim 12, wherein the prognostic algorithm requirement statement is provided in a form at least substantially similar to the following: the prognostic algorithm or algorithms shall provide a minimum of <TTM> hours time-to-maintenance such that between <LOWER>% and <UPPER>% of failures of <COMPONENT NAME> will be avoided with <LEVEL>% confidence.

14. The method as defined in claim 12, wherein the prognostic algorithm requirement statement is provided in a form at least substantially similar to the following: the prognostic algorithm or algorithms shall provide a minimum of <TTM> hours time-to-maintenance such that between <LOWER_x>% and <UPPER_x>% of <FAILURE_MODE_x> failures of <COMPONENT NAME> for each of x=1 to n plurality of failure modes will be avoided with <LEVEL>% confidence.

15. The method as defined in claim 12, wherein the step of determining a probability density function comprises determining a joint probability function for a plurality of failure modes each associated with the preselected component.

16. The method as defined in claim 12, wherein the step of determining a confidence value comprises determining a confidence value that accounts for individual prognostic algorithm requirements for each of a plurality of failure modes each associated with the preselected component.

17. The method as defined in claim 12, wherein the step of determining a confidence value includes accounting for one or more non-prognosticable failure modes.

18. The method as defined in claim 12, further comprising the step of forming a two-dimensional table or chart identifying confidence level values based upon a continuum of the number of component failures of the preselected component prior to scheduled replacement and a continuum of the total number of replacements of the preselected component for each of the plurality of vehicles.

19. A method of performing a verification of satisfaction of requirements of a prognostic algorithm requirements statement to monitor management of component part replacement for a vehicle, the method comprising the steps of:

providing a prognostic algorithm requirements statement for a preselected component contained in each of a plurality of vehicles;

determining a joint probability density function providing a probability of failing to replace a number of the preselected components as part of a maintenance program due to failure of the respective components before replacing the respective components according to one or more time-to-maintenance measures provided by a corresponding one or more prognostic algorithms designed to satisfy requirements indicated in the prognostic algorithm requirements statement;

responsive to the determined joint probability density function, determining a confidence value indicating a level of confidence that between $a_i \leq f_i \leq b_i$ failures of the preselected component for $i=1 \ldots k$ failure modes are avoided through application of the one or more prognostic algorithms, wherein $f_i$ is a percentage of failures for failure mode i that would be avoided by performing maintenance according to the one or more time-to-maintenance measures provided by a corresponding one or more prognostic algorithms designed to satisfy requirements indicated in the prognostic algorithm requirements statement, wherein $a_i$ is the lower bound of $f_i$ percentage of failures for failure mode i, and wherein $b_i$ is the upper bound of $f_i$ percentage of failures for failure mode i;

responsive to the determined confidence value, verifying whether or not the prognostic algorithm requirements provided in the prognostic algorithm requirements statement are being satisfied according to a preselected minimum level of confidence; and making a real-time mission decision based on the step of verifying whether or not the prognostic algorithm requirements provided in the prognostic algorithm requirements statement are being satisfied according to a minimum of a preselected level of confidence.

20. The method as defined in claim 19, wherein the joint probability density function is a k-dimensional joint probability density function; and wherein the step of determining a confidence value comprises determining a confidence value that accounts for individual prognostic algorithm requirements for each of a plurality of failure modes each associated with the preselected component.

21. The method as defined in claim 19, wherein the step of determining a confidence value includes accounting for one or more non-prognosticable failure modes.

22. The method as defined in claim 19, further comprising the step of forming a two-dimensional table or chart identifying confidence level values based upon a continuum of the number of component failures of the preselected component prior to scheduled replacement and a continuum of the total number of replacements of the preselected component for each of the plurality of vehicles.

23. The method as defined in claim 19, wherein the prognostic algorithm requirement statement is provided in a form at least substantially similar to the following: the prognostic algorithm or algorithms shall provide a minimum of <TTM> hours time-to-maintenance such that between <LOWER>% and <UPPER>% of failures of <COMPONENT NAME> will be avoided with <LEVEL>% confidence.

24. The method as defined in claim 19, wherein the prognostic algorithm requirement statement is provided in a form at least substantially similar to the following: the prognostic algorithm or algorithms shall provide a minimum of <TTM> hours time-to-maintenance such that between <LOWER_x>% and <UPPER_x>% of <FAILURE_MODE_x> failures of <COMPONENT NAME> for each of x=1 to n plurality of failure modes will be avoided with <LEVEL>% confidence.

* * * * *